US012681202B2

(12) United States Patent
Wang et al.

(10) Patent No.: US 12,681,202 B2
(45) Date of Patent: Jul. 14, 2026

(54) DETERMINING INVADED ZONES IN RESISTIVITY LOGGING

(71) Applicant: Halliburton Energy Services, Inc., Houston, TX (US)

(72) Inventors: Xusong Wang, Singapore (SG); Baris Guner, Houston, TX (US); Ahmed Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 416 days.

(21) Appl. No.: 18/244,125

(22) Filed: Sep. 8, 2023

(65) Prior Publication Data

US 2025/0085449 A1     Mar. 13, 2025

(51) Int. Cl.
*G01V 3/20*        (2006.01)
*E21B 49/00*       (2006.01)

(52) U.S. Cl.
CPC ................ *G01V 3/20* (2013.01); *E21B 49/00* (2013.01); *E21B 2200/20* (2020.05)

(58) Field of Classification Search
CPC ........ G01V 3/20; E21B 49/00; E21B 2200/20
See application file for complete search history.

(56) References Cited

U.S. PATENT DOCUMENTS 4,338,664 A * 7/1982 Mayer .................. G01V 11/002
702/11
10,458,230 B2 10/2019 Donderici et al.

2007/0083330 A1* 4/2007 Frenkel .................... G01V 3/20
702/7
2016/0033673 A1 2/2016 Liang et al.
2016/0061987 A1 3/2016 Kherroubi et al.
2018/0203151 A1 7/2018 Kouchmeshky et al.
2019/0032480 A1 1/2019 Capoglu et al.

OTHER PUBLICATIONS

Yan, "Inversion of Magneto-telluric Data Constrained by Borehole Logs and Reflection Seismic Sections", 2016, UPPSALA University Publication, pp. 1-78 (Year: 2016).*
International Search Report and Written Opinion for International Patent Application No. PCT/US2023/076245 dated May 24, 2024. PDF file. 6 pages.

* cited by examiner

*Primary Examiner* — Elias Desta
(74) *Attorney, Agent, or Firm* — John Wustenberg; C. Tumey Law Group PLLC

(57)        ABSTRACT

A method comprising: disposing a tool into a borehole, wherein the tool comprises: one or more guard electrodes configured to transmit a current into at least a formation surrounding the borehole; and one or more monitor electrodes configured to obtain one or more measurements from at least the formation surrounding the borehole. The method may be further configured to perform a first and second inversion on the one or more measurements to form a first inversion set; forming a misfit of the first inversion and a misfit of the second inversion based at least on the first inversion set and second inversion set; determining a weighting inversion coefficient based at least on the misfit of the first inversion and the misfit of the second inversion; and combining the first invasion set, the second invasion set, and/or weighting inversion coefficient to form one or more inversion products.

20 Claims, 24 Drawing Sheets

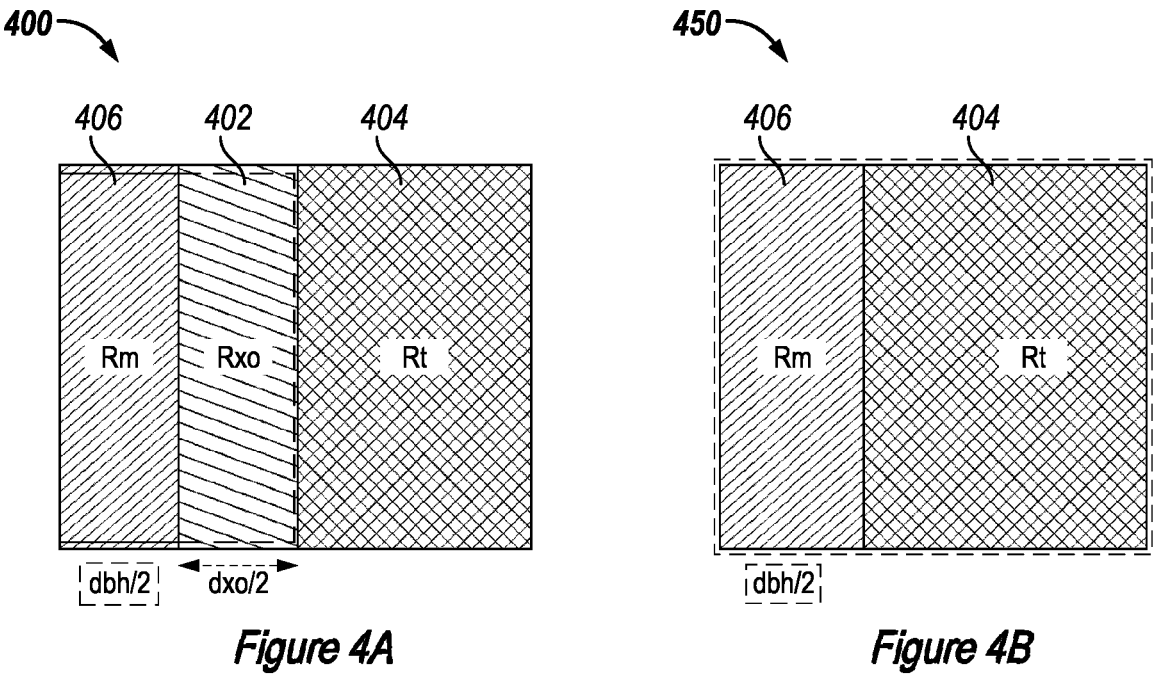
Figure 4A
Figure 4B
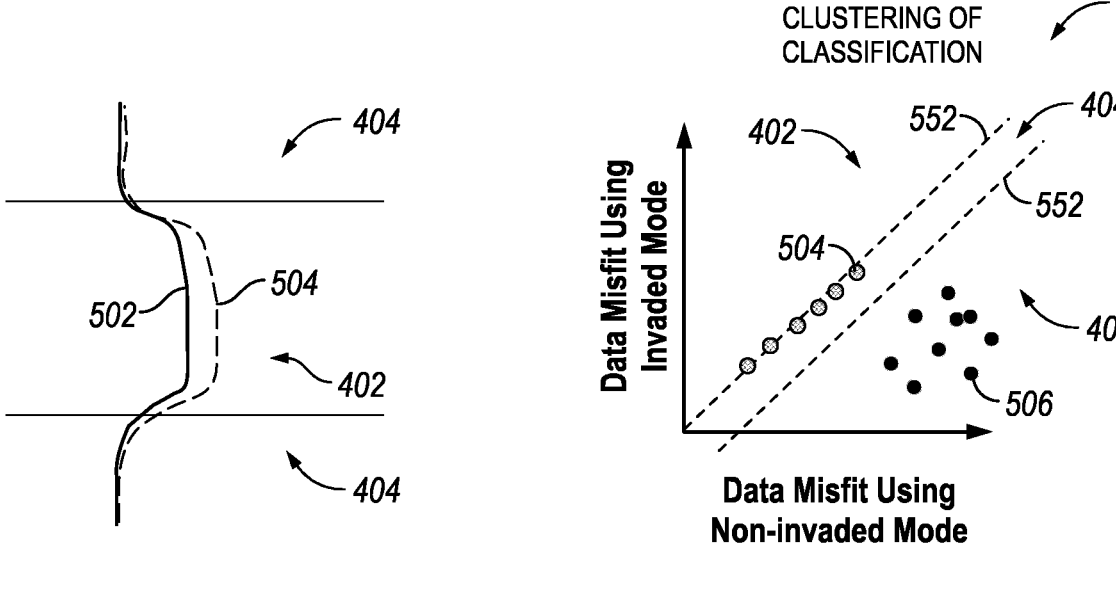
Figure 5A
Figure 5B

DETERMINING INVADED ZONES IN RESISTIVITY LOGGING

BACKGROUND

Understanding the structure and properties of geological formations often reduces the cost of drilling wells for oil and gas exploration. Measurements are typically performed in a borehole (i.e., downhole measurements) in order to attain this understanding. To obtain such measurements, a variety of sensors and mounting configurations may be used. For example, resistivity tools are widely used in oil field exploration applications for determining zones in a formation that may contain hydrocarbons. Accurate determination of the formation resistivity may be useful in assessing the feasibility of production for a particular well. However, resistivity measured by the tool is often affected by factors other than the formation resistivity. For example, if a formation fluid invades the well, resistivity measurements may be contaminated.

Identifying such invasion zones may be critical for mitigating, fixing, and/or eliminating contaminated resistivity measurements. Further it may be difficult if not impossible to determine which resistivity measurements are contaminated without information of invasion zones. As such, the presence, properties, and extent of invasion zones may be critical to determine to avoid and/or correct for contaminated resistivity measurements. However, there are several shortcomings for identifying invasion zones.

For example, the standard to differentiate the invasion and non-invasion zones may implement borehole corrected BC resistivities variation. Ideally, BC should correct for borehole effects and remove borehole dependence. However, inaccuracies and noise in mud resistivity and caliper measurements that are used to perform borehole correction may lead to errors when this standard is used. Furthermore, BC resistivity variation does not have a high dynamic variation range, amplifying the effects of noise and making it difficult to determine a threshold. Additionally, this threshold and other inversion parameters may need to be fine-tuned manually to achieve a desired result if invasion/non-invasion formation is not properly identified. As such, an indicator for telling the user the confidence in the determined invasion zones is needed.

BRIEF DESCRIPTION OF THE DRAWINGS

These drawings illustrate certain aspects of some examples of the present disclosure and should not be used to limit or define the disclosure.

FIG. 4A illustrates a step radial formation model;

FIG. 4B illustrates step model without invasion;

FIG. 5A illustrates a principle to use data misfits to separate the invaded and non-invaded zones;

FIG. 5B illustrates data misfit cross plot;

DETAILED DESCRIPTION

Disclosed herein are systems and methods for resistivity logging and, more particularly, examples provide systems and methods for determining invaded and non-invaded zones in resistivity logging. Advantageously, the example systems and methods provide a new robust standard classifying the invaded and non-invaded formation consistently and accurately. Furthermore, an indicator for measuring the inversion quality may also guide the user in fine tuning the inversion constraint parameters. To reduce the subjectivity of the choice of the constraint parameters and automatize the process, automatic selection and tuning of the constraint parameters may be implemented. Furthermore, to remove the spikes in the inversion results and to improve the noise characteristics, statistical methods for smoothing the inversion results may be applied in the inversion algorithm.

Figure 1:
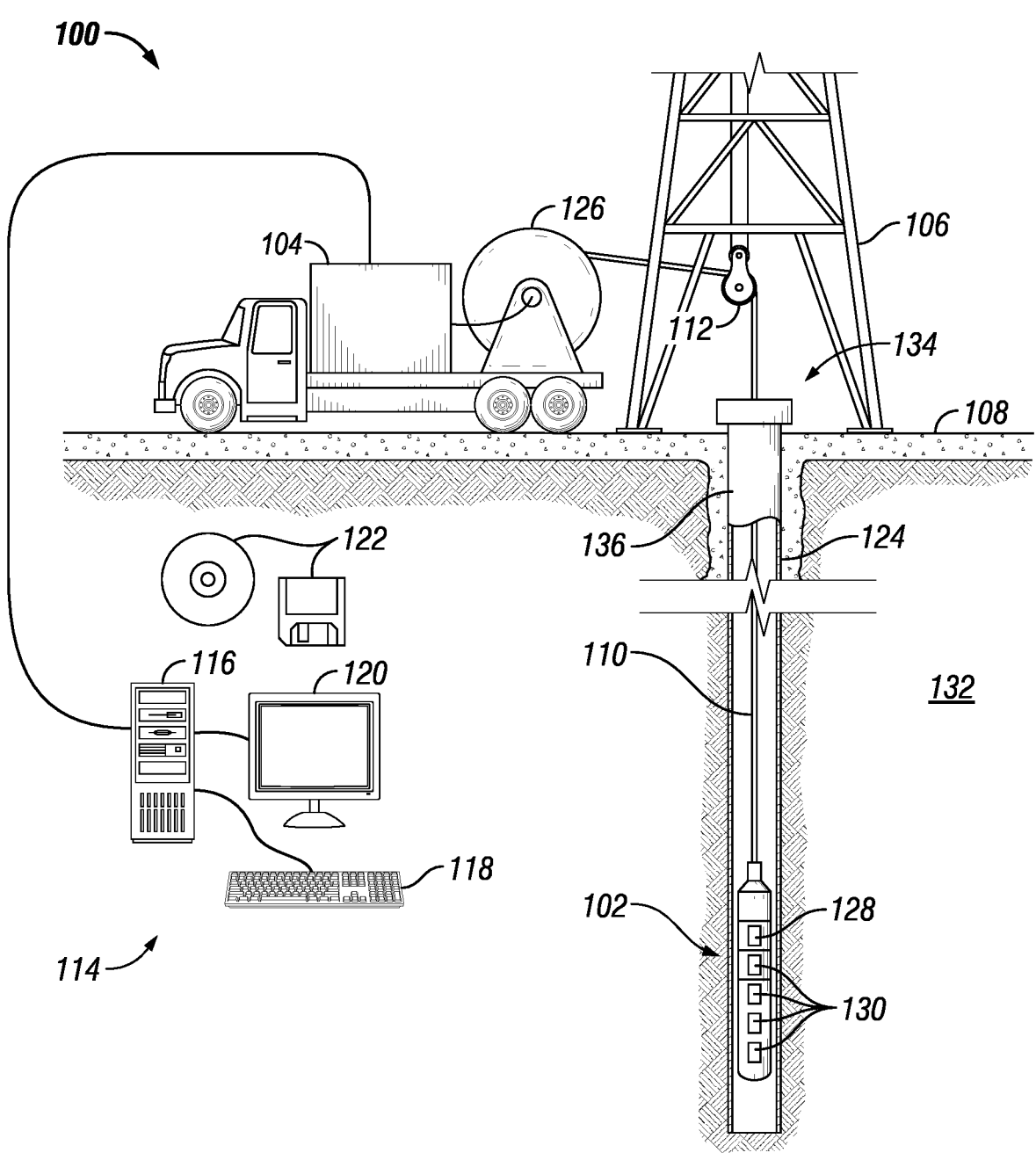
FIG. 1 illustrates a cross-sectional view of a borehole resistivity logging system.

FIG. 1 illustrates a cross-sectional view of a borehole resistivity logging system 100. As illustrated, borehole resistivity logging system 100 may comprise array laterolog tool 102 attached to a vehicle 104. In examples, it should be noted that array laterolog tool 102 may not be attached to a vehicle 104. Array laterolog tool 102 may be supported by rig 106 at surface 108. Array laterolog tool 102 may be tethered to vehicle 104 through conveyance 110. Conveyance 110 may be disposed around one or more sheave wheels 112 to vehicle 104. Conveyance 110 may include any suitable means for providing mechanical conveyance for array laterolog tool 102, including, but not limited to, wireline, slickline, coiled tubing, pipe, drill pipe, downhole tractor, or the like. In some embodiments, conveyance 110 may provide mechanical suspension, as well as electrical connectivity, for array laterolog tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. Electrical conductors may be used for communicating power and telemetry between vehicle 104 and array laterolog tool 102. Information from array laterolog tool 102 may be gathered and/or processed by information handling system 114. For example, signals recorded by array laterolog tool 102 may be stored on memory and then processed by array laterolog tool 102. The processing may be performed real-time during data acquisition or after recovery of array laterolog tool 102. Processing may alternatively occur downhole or may occur both downhole and at surface. In some embodiments, signals recorded by array laterolog tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to array laterolog tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as an input device 118 (e.g., keyboard, mouse, etc.) and a video display 120. Information handling system 114 may also include one or more buses operable to transmit communications between the various hardware components. Information handling system may be configured to operate, manage, and monitor the functions and results of one or more guard electrode 128 and one or more monitor electrode 130.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

As illustrated, array laterolog tool 102 may be disposed in borehole 124 by way of conveyance 110. Borehole 124 may extend from a wellhead 134 into a formation 132 from surface 108. Generally, borehole 124 may include horizontal, vertical, slanted, curved, and other types of borehole geometries and orientations. Borehole 124 may be cased or uncased. In examples, borehole 124 may comprise a metallic material, such as tubular 136. By way of example, tubular 136 may be a casing, liner, tubing, or other elongated steel tubular disposed in borehole 124. As illustrated, borehole 124 may extend through formation 132. Borehole 124 may extend generally vertically into formation 132. However, borehole 124 may extend at an angle through formation 132, such as horizontal and slanted boreholes. For example, although borehole 124 is illustrated as a vertical or low inclination angle well, high inclination angle or horizontal placement of the well and equipment may be possible. It should further be noted that while borehole 124 is generally depicted as a land-based operation, those skilled in the art may recognize that the principles described herein are equally applicable to subsea operations that employ floating or sea-based platforms and rigs, without departing from the scope of the disclosure.

In examples, rig 106 includes a load cell (not shown) which may determine the amount of pull on conveyance 110 at surface 108 of borehole 124. While not shown, a safety valve may control the hydraulic pressure that drives drum 126 on vehicle 104 which may reel up and/or release conveyance 110 which may move array laterolog tool 102 up and/or down borehole 124. The safety valve may be adjusted to a pressure such that drum 126 may only impart a small amount of tension to conveyance 110 over and above the tension necessary to retrieve conveyance 110 and/or array laterolog tool 102 from borehole 124. The safety valve is typically set a few hundred pounds above the amount of desired safe pull on conveyance 110 such that once that limit is exceeded; further pull on conveyance 110 may be prevented.

In examples, array laterolog tool 102 may operate with additional equipment (not illustrated) on surface 108 and/or disposed in a separate borehole resistivity logging system (not illustrated) to record measurements and/or values from formation 132. Array laterolog tool 102 may comprise guard electrode 128. guard electrode 128 may be connected to information handling system 114, which may further control the operation of guard electrode 128. Guard electrode 128 may include any suitable transmitter for generating current for inducing electromagnet (EM) waves that travel into formation 132. Additionally, current may transmit through one or more guard electrodes 128 to focus the current into the formation laterally. Otherwise, current may flow through the conducting mud and resulting in low sensitivity to the formation.

In examples, array laterolog tool 102 may comprise one or more guard electrodes 128. During operations, guard electrode 128 may emit current from and along array laterolog tool 102. Such current may travel through mud and formation 132 comprising an invaded zone. In examples, one or more guard electrodes 128 may not make the focusing in real time. Instead, focusing may be performed through software. As such, voltages may be measured by one or more monitor electrodes 130 current is emitted from one or more guard electrodes 128. Then, by setting the difference of pairs of monitor electrodes zero in software, obtaining equipotential conditions that enforce currents to travel into the formation may be performed. The ratio of the measured voltage from one or more of the monitor electrodes (for example, average of voltages of M1 and M1') to current transmitted from the survey electrode A0 may yield an indication of the resistivity of the path the current travels through, including the mud resistivity, resistivity of the invaded zone and the formation resistivity. The primary interest may be in formation resistivity, but invaded zone resistivity may also be important. Mud resistivity is generally measured through other means and may be assumed to be known. Furthermore, in general mud resistivity has limited contribution to the measured resistivity since we have a water-based mud that is highly conductive and as mentioned, current is forced to travel through the formation with the help of guard electrodes.

For example, levels of transmitted current could be from 0.001 amps to 1,000 amps. The present technique should not be limited to these current ranges. Further, Array laterolog tool 102 may comprise one or more monitor electrodes 130. One or more monitor electrodes 130 may be connected to information handling system 114, which may further control the operation of monitor electrodes 130. Monitor electrodes 130 may be configured to evaluate changes in current and/or voltage along array laterolog tool 102. FIG. 1 illustrates an example of an array laterolog tool 102 disposed within borehole 124, but a more detailed configuration may be provided below.

Figures 2, 3:
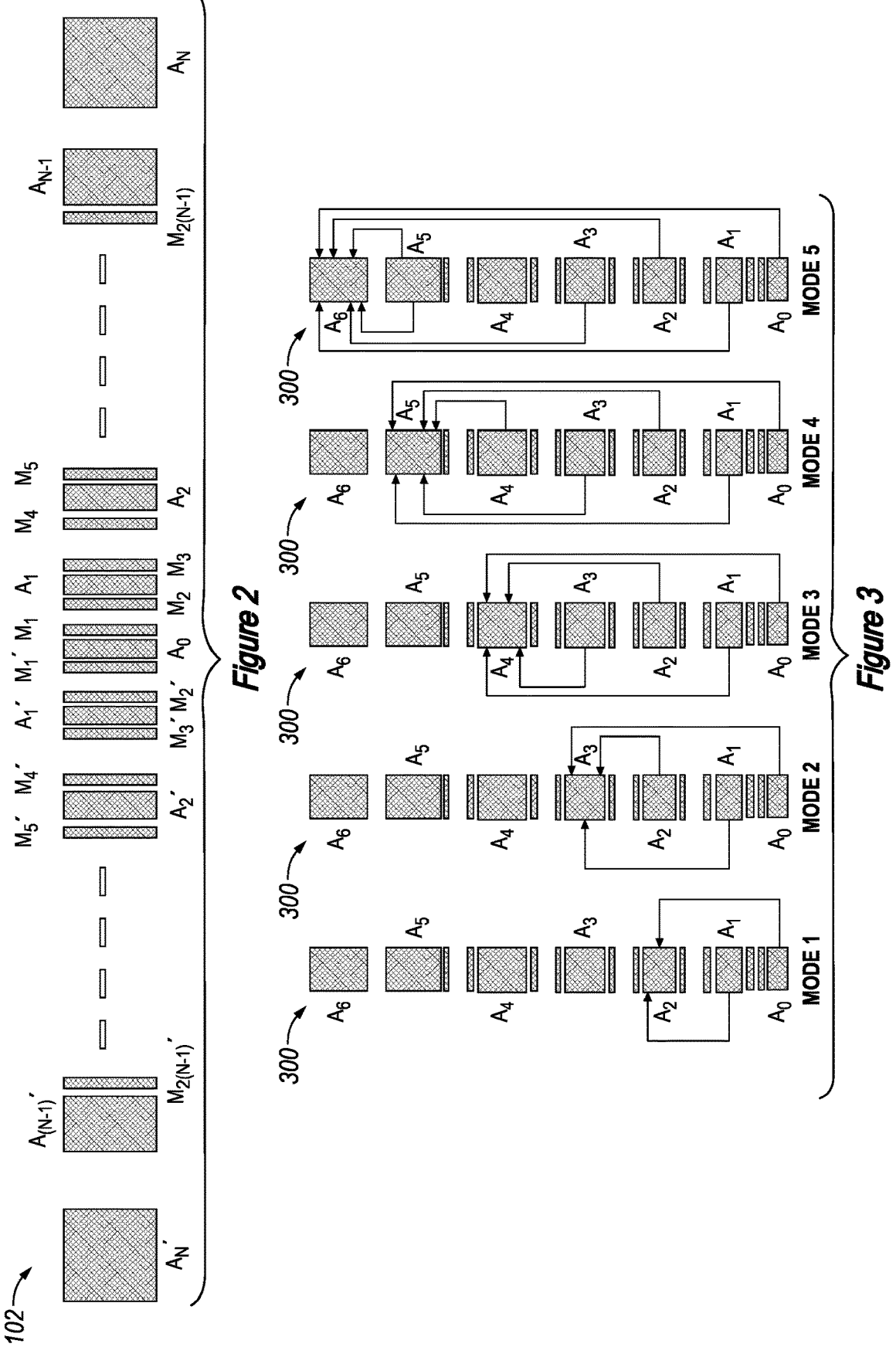
FIG. 2 illustrates a block diagram of a laterolog array tool.
FIG. 3 illustrates operational modes 1-5 of the laterolog array tool.

FIG. 2 illustrates a block diagram of a laterolog array tool 102. Herein, survey electrode is denoted by the label $A_0$. There may be any number of N, 2N guard electrodes 128

$$(A_1, A_1', \ldots, A_N, A_N')$$

and 4N-4 monitor electrodes $$130(M_1, M_1', M_2, M_2', \ldots, M_{2(N-1)}, M_{2(N-1)}').$$

Array laterolog tool 100 may operate such that voltages at (or voltage differences between) monitor electrodes are measured as a function of the current emitted from different combinations of one or more guard electrodes 128. Functions of currents emitted from one or more guard electrodes 128 may be acquired at one or more depths by one or more monitor electrodes 130. As an example, the laterolog array tool 102 may provide N excitation modes, as noted in Equation (1):

$$I_{A_{N-1}} + I_{A_{N-1}}' = 1 \qquad \text{Equation (1)}$$

$$\text{Ampere, where}$$

$$I_{A_0} = 0, I_{A_i} + I_{A_i}' = 0,$$

$$i = 1, \ldots, N - 2$$

Where $I_{A_i}$ is the current emitted from electrode. In excitation modes, currents are returned to current electrodes $A_N$ and $A_N'$. Further, ' over a component indicates an equal and symmetrical component flipped over a horizontal axis.

Equation (1) may apply for every immediate ith electrode. It illustrates how a tool may be excited and how current may be recorded for different voltages for different currents. For example, A0 may be excited, then A1+A1', then A2+A2' etc. In examples, this may be done simultaneously using a range of different frequencies. However, the measurements of this stage are not used directly but go through software focusing to force currents into the formation as mentioned above. In software focusing, weights of different excitation modes may be adjusted such that their sum gives zero voltage between certain monitor electrode pairs which are different for each focusing mode.

Focusing algorithms may utilize the principle of superposition for combining measurements from different excitation modes, providing a result that is equivalent to forcing the current emitted from the survey electrode to travel in a narrow path close to the survey electrode. This is accomplished by setting the potential difference between monitor electrode pairs to zero, preventing the flow of current in that direction, Furthermore, emitted current may be directed to return to different guard electrodes at different distances with respect to the survey electrode. Since the depth of investigation is proportional to the separation between the electrode emitting current and the return electrode, different linear combinations of excitation modes can be employed to make measurements at different depths of investigation. As mentioned, in examples focusing may be made in hardware in real-time. In that case, there are no separate excitation and focusing modes. Focusing is performed by adjusting the currents of the survey and guard electrodes in real-time by using the voltage differences between the monitor electrodes in a feedback loop. Although hardware and software focusing implementations differ in how they are applied, results obtained from both results should be the same if the measurements are assumed to be without noise and errors. Furthermore, while laterolog array tool 102 may be utilized in the various examples that follow, this is done as a matter of convenience, and the various embodiments are not to be so limited. Thus, the methods described herein can be applied to radial 1D inversions of measurements made by a variety of tools, including array induction tools, among others.

FIG. 3 illustrates operational modes 1-5 of the laterolog array tool 102. Array 300 in FIG. 3 may be only a case of laterolog array tool 102 shown in FIG. 2, with N=6. In examples, this specific configuration (i.e., N=6) may be used to provide examples of use for various method embodiments, and the operational Modes 1 to 5 (i.e., N−1) for the tool 300 will now be described.

In Mode 1, currents from $A_0$, $A_1$, and $$A_1' \text{ return to } A_2 \text{ and } A_2'.$$

To accomplish focusing in this mode, the voltage difference of $(VM_1+VM_1')-(VM_2+VM_2')$ is set to 0.

In Mode 2, currents from $A_0$, $A_1$, $$A_1', A_2, \text{ and } A_2' \text{ return to } A_3 \text{ and } A_3'.$$

To accomplish focusing in this mode, the voltage differences of $$(VM_1 + VM_1') - (VM_2 + VM_2')$$

and $$(VM_3 + VM_3') - (VM_4 + VM_4')$$

are set to 0.

In Mode 3, currents from $A_0$, $A_1$, $$A_1', A_2, A_2', A_3, \text{ and } A_3' \text{ return to } A_4 \text{ and } A_4'.$$

To accomplish focusing in this mode, the voltage differences of $$(VM_1 + VM_1') - (VM_2 + VM_2'),$$

$$(VM_3 + VM_3') - (VM_4 + VM_4') \text{ and } (VM_5 + VM_5') - (VM_6 + VM_6')$$

set to 0.

In Mode 4, currents from $A_0$, $A_1$, $A_1'$, $A_2$, $A_2'$, $A_3$, $A_3'$, $A_4$, and $A_4'$ return to $A_5$ and $A_5'$. To accomplish focusing in this mode, the voltage differences of $$(VM_1 + VM_1') - (VM_2 + VM_2'), (VM_3 + VM_3') - (VM_4 + VM_4'),$$

$$(VM_5 + VM_5') - (VM_6 + VM_6') \text{ and } (VM_7 + VM_7') - (VM_8 + VM_8')$$

are set to 0.

In Mode 5, currents from $$A_0, A_1, A_1', A_2, A_2', A_3, A_3', A_4, A_4', A_5, \text{ and } A_5'$$

return to $A_6$ and $A_6'$. To accomplish focusing in this mode, the voltage differences of $$(VM_1 + VM_1') - (VM_2 + VM_2'),$$

$$(VM_3 + VM_3') - (VM_4 + VM_4'), (VM_5 + VM_5') - (VM_6 + VM_6'),$$

$$(VM_7 + VM_7') - (VM_8 + VM_8') \text{ and } (VM_9 + VM_9') - (VM_{10} + VM_{10}')$$

are set to 0. Thus, as the mode number increases, emitted currents propagate to return electrodes that are further away from the source, providing a deeper investigation of the formation.

Modules (1)-(5) of array 300 may be used to differentiate invaded and non-invaded zones. For example, a one-dimensional radial inversion of a resistivity log from modules (1)-(5) of array 300 may produce information to differentiate invaded and non-invaded zones. One-dimensional radial inversion may first receive the measured apparent resistivities and match them to apparent resistivities of a forward model of the formation. The difference between the measurement and reconstructed apparent resistivities is used in determining the cost function.

FIG. 4A illustrates a step radial formation model 400. In step radial formation model 400, a layer of formation invaded with mud fluid 402 may comprise a step profile with invasion resistivity $R_{xo}$. Herein a step profile indicates there is no transition zone between invaded zone and the formation along the radial direction. In such an example, all layers are assumed to be infinite in extent in the axial direction. In examples the inversion may be repeated using this formation model at each logging point (or depth). In such an inversion, results at each point may be assumed to be essentially independent, although some constraints may be applied on the inversion results based on the results of the adjacent logging points and/or results of the inversion may be smoothed for better looking results.

The invasion diameter thickness $d_{xo}$ may be the extent of invasion of mud fluid into formation 132 (e.g., referring to FIG. 1). Formation model 400 may further comprise non-invaded true formation layer 404 with formation resistivity $R_t$. The inner-most radial layer may be drilling mud layer 406 and comprises mud layer diameter thickness $d_{bh}$ with mud resistivity $R_m$. Mud resistivity $R_m$ may be measured, for example through a mud cell. Mud cell may be a tool or a part of a tool which may be used to analyze a mud sample. Mud cell may be located uphole. In this case, mud cell may be a cylindrical flask shaped tool. Measured mud resistivity may then be extrapolated to determine downhole mud resistivities for the temperature and pressure experienced downhole. Mud cell can also be implemented downhole in borehole 124 on the tool body, and it may measure the properties of the mud samples at different logging depths. Borehole diameter may also be measured, for example using a caliper tool. Or they may be solved as a part of an inversion. In other embodiments, alternative formation models may be assumed. For example, instead of a step radial formation model for invasion, a linear profile may be used. Further, additional radial layers may be assumed. However, these require additional unknowns to be solved in the inversion process (as is the case with mud resistivity and borehole diameter if they are not measured) and thus, provides additional computational complexity. Furthermore, inversion problem becomes underdetermined if there are more unknowns than measurements. Further, the presence of noise, shoulder bed effects, etc. may compromise the accuracy of the inversion. To obtain the results that are accurate as well as visually satisfying for a majority of practical cases in the presence of such effects, "regularization" may be implemented.

In other examples, more formation models may be assumed. For example, instead of a step radial formation model for invasion, a linear profile may be used. Further, additional radial layers may be assumed. However, these require additional unknowns to be solved in the inversion process (as is the case with mud resistivity and borehole diameter if they are not measured) and thus, provides additional computational complexity. Furthermore, inversion problem becomes underdetermined if there are more unknowns than measurements. Further, the presence of noise, shoulder bed effects, etc. may compromise the accuracy of the inversion. To obtain the results that are accurate as well as visually satisfying for a majority of practical cases in the presence of such effects, "regularization" may be implemented.

Regularization may be applied by adding additional terms to the cost function that represents the desired constraints on the inversion results, hence finding the best solution within the desired constraints. Further, the intrinsic ambiguity of the inversion when formation resistivity $R_t$ is within an adjustable threshold to invasion resistivity $R_{xo}$. Herein a adjustable threshold may be from 500-100 ohms, 100 ohms-10 ohms, 10 ohms-. 1 ohms, or 0.1 ohms-. 001 ohms. In those cases, a wide range for formation resistivity $R_t$, invasion resistivity $R_{xo}$, and invasion diameter thickness $d_{xo}$ values provide similar responses. Thus, inversion results are highly affected by measurement as well as numerical noise and the resulting log may be confusing for the analysts. In examples, there may also be no invasion.

FIG. 4B illustrates step model without invasion 450. With zero invasion, an inversion solution with an arbitrary invasion diameter thickness $d_{xo}$ value and formation resistivity $R_t$ and invasion resistivity $R_{xo}$ both equal to formation resistivity Rt. A solution with 0 invasion diameter thickness $d_{xo}$ would be an accurate solution. Although regularization constraints overcome some ambiguity and provide a smoother resistivity log, they may be sensitive to the varying environmental conditions for each specific well. Furthermore, they tend to constrain invasion even in cases when the formation is clearly invaded, thus leading to artificially low invasion diameter results. Herein, an alternative metric that is more robust and has a higher sensitivity to the variations in environmental conditions may be implemented in an inversion below.

FIG. 5A illustrates a principle to use data misfits to separate the invaded and non-invaded zones, as implemented in the inversion below. Herein, the horizontal axis may misfit and the vertical axis is depth. FIG. 5A illustrates misfit between borehole data and the simulated physical responses for the inverted formation and tool parameters using two different formation models. In one formation model, invaded zone is included as in FIG. 4A while in the other model, no invasion layers are present as in FIG. 4B. For example, data misfit may be defined as the difference between measurement and simulated physical response for a given formation and borehole properties. Data misfit may be calculated by the sum of squared differences between borehole data and the simulated physical responses. Data misfit of the non-invaded model 504 and the invaded model 502 are close in zones that are actually non-invaded 404 since non-invaded model is correct for these layers, as described above to invert formation properties. In contrast, in invaded zone 402, the data misfit for the inversion using the non-invaded formation model 504 is significantly higher than the invaded formation model 502 because the non-invaded model does not properly describe the formation.

FIG. 5B illustrates data misfit cross plot 550. Data misfit cross plot lines 552. In examples, data misfit cross plot lines 552 may encompass all depths such that a misfit between borehole data and the simulated physical responses using inversion results from the invaded model and the non-invaded model are similar. As such, depths that are likely to be non-invaded lies within data misfit cross plot lines 552 and depths that are likely to be invaded 506 lies outside lines 552.

Figure 6:
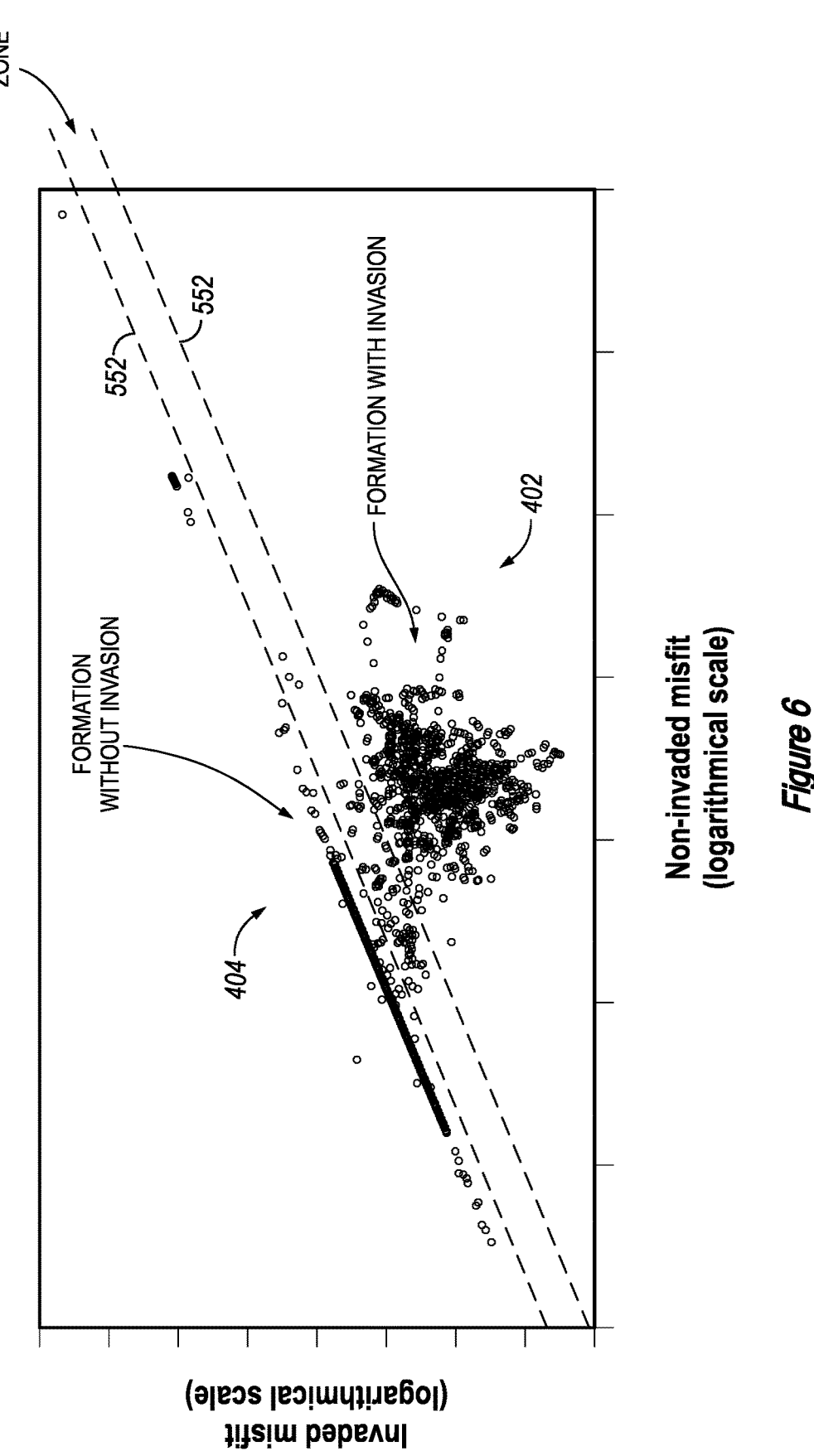
FIG. 6 illustrates two misfits following a 1 to 1 lines.

FIG. 6 illustrates a cross-plot of the misfits using two different inversions with inversion models assuming no invasion layers and with invasion layers. In other words, FIG. 6 shows the same results as FIG. 5, but this time obtained using actual data. As discussed above, if the data misfit of the invaded model is significantly smaller than non-invaded model, then the formation at this point may be invaded. As such, inversion results using the invaded model may have a closer match between reconstructed physical response and measurements. Thus, in FIG. 6, the depths below transition zone (i.e., below the lines closer to the horizontal axis) may be invaded, and the depths above transition zone may be non-invaded. In the transition zone, a joint solution between the inversion results of the invaded model and non-invaded model may be produced to ensure a smooth output. The mixing coefficient may be determined by distance between two boundaries. although lines have been used to separate depth points that are deemed to be invaded and non-invaded, other decision boundaries may be used in alternative implementations. These include simple thresholds (i.e., constants), or higher order polynomials.

Figure 7:
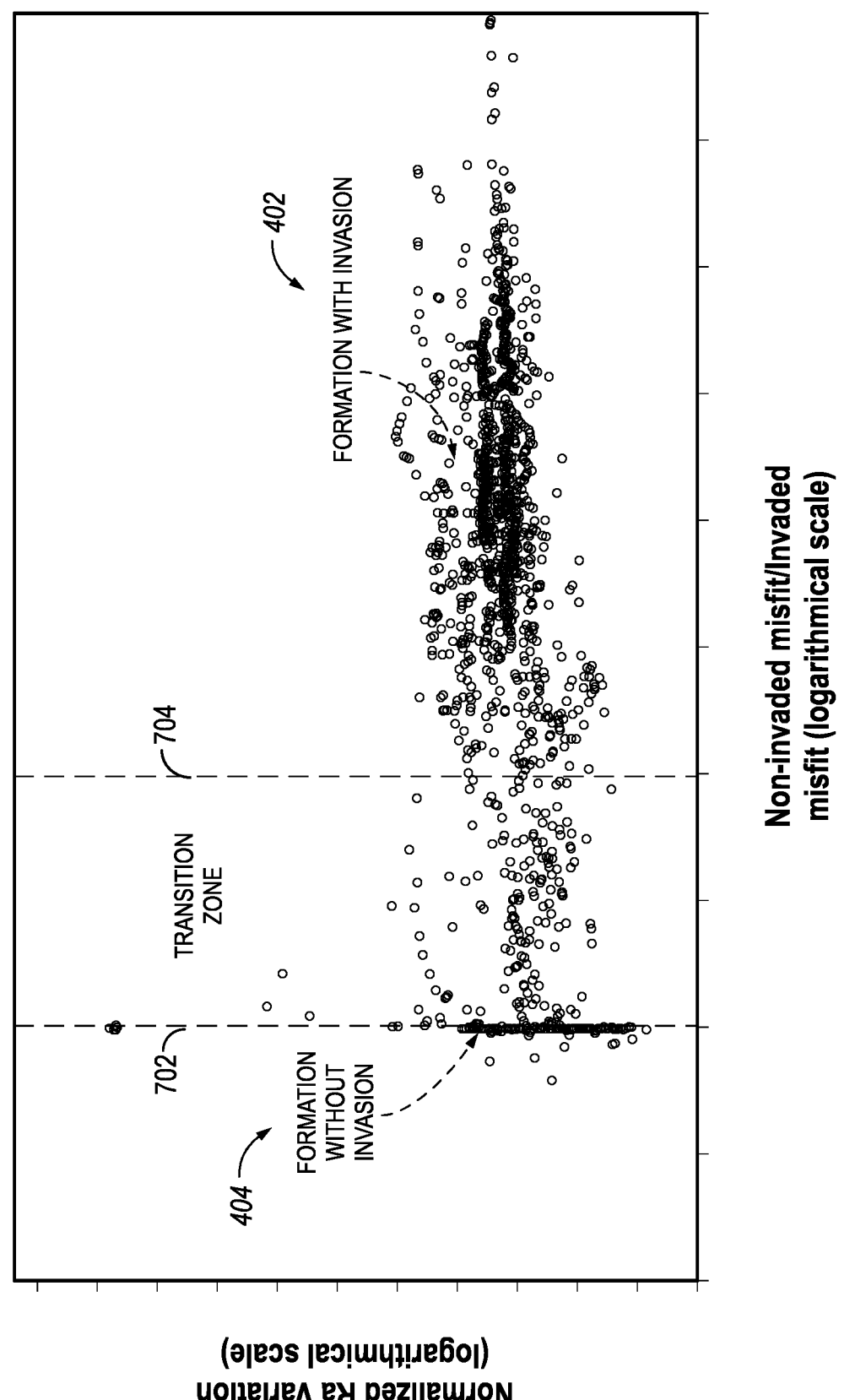
FIG. 7 illustrates an example cross plot of ratio between non-invaded data misfit and invaded data misfit and measurement variation.

FIG. 7 illustrates an example cross plot of ratio between non-invaded data misfit and invaded data misfit and BC resistivity variation, later of which has been used to separate invaded and non-invaded zones in prior art. The horizontal axis is the ratio misfit between non-invaded data misfit and invaded data misfit. The vertical axis is the normalized BC resistivity variation. The normalized BC resistivity variation may not separate invaded and non-invaded mode effectively because the scattering spread in vertical direction is not obvious. However, in the direction of the data misfit along the horizontal axis as a standard to separate the invasion and non-invasion zone, the spread is quite clear, and the two dotted red lines may be used to separate the invaded and non-invaded depth points. Decision boundaries 1 702 and decision boundary 2 704 may be determined empirically using simulated logs where the ground truth data (i.e., amount of invasion at each point) is known. An inversion algorithm may be used to solve for formation and borehole parameters corresponding to a set of measurements at a depth point using invaded and non-invaded models, and thus calculate the ratio of the misfits obtained from the non-invaded and invaded models as shown in FIGS. 6 and 7.

Figure 8:
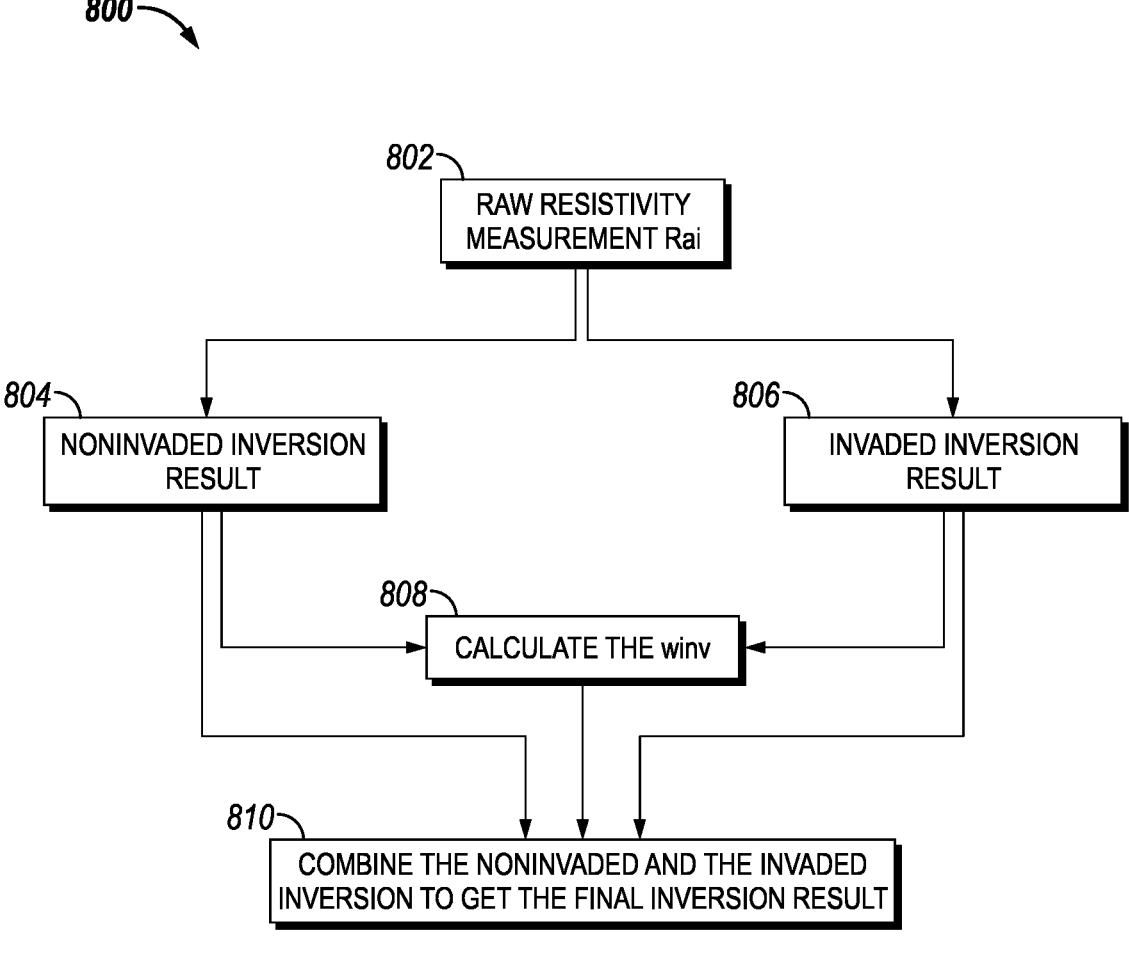
FIG. 8 illustrates inversion algorithm workflow.

FIG. 8 illustrates inversion algorithm workflow 800 using data misfit ratio to separate invaded and non-invaded zones. In examples, inversion algorithm workflow 800 may be performed by an information handling system 114. In block 802, array laterolog tool 102 (e.g., referring to FIG. 1) may acquire one or more measurements as functions of current or voltage emitted from one or more guard electrodes 128 at one or more depths by one or more monitor electrodes 130 at one or more depths. Measurements at one or more depths from block 802 may be utilized in two inversions at every depth from one or more measurements. In block 804, a first inversion may utilize step model without invasion 450 (e.g., referring to FIG. 4B) and may solve for at least Rt. In block 806, a second inversion may utilize step radial formation model 400 (e.g., referring to FIG. 4A) and may solve for at least invasion resistivity $R_{xo}$, invasion diameter thickness $d_{xo}$, and/or formation resistivity $R_t$. In examples, step radial formation model 400 and step model without invasion 450 may be more complex than illustrated in FIG. 4. For example, for step radial formation model 400, a transition zone between invaded zone 402 and the non-invaded zone 404 may be included in the model. These inversions may also solve for additional parameters such as tool eccentricity, mud resistivity, and/or the like. As previously mentioned, mud resistivity Rm and borehole diameter dbh may be measured through external means or they can also be solved as part of the inversion.

After an inversion, for both blocks 804 and 806, a separate data misfit may be calculated in each block. In examples, calculating data misfit may comprise simulating the tool response corresponding to the inverted parameters and then calculating a measure of the difference between the actual measured response from each inversion and the simulated response from each inversion. For example, this measure of the difference may be the $L^2$ norm, that is the square root of the sum of the squared differences between each measurement component and the corresponding component of the simulated response. These components correspond to the measurements of individual monitor electrodes. In some examples, some of the measurements may be given a higher weight than the other components. Further, a ratio of the misfit of block 804 to the misfit calculated in block may be formed at every depth to produce a misfit ratio.

In block 808, a weighting inversion coefficient winy for combining the products determined in blocks 804 and 806 may be determined. It may be desirable to determine weighting inversion coefficient winy because they are generally applied to blend measurements between invaded and non-invaded zones. For example, determining their distance from first decision 702 (e.g., referring to FIG. 7) boundary and a second decision boundary 704. Herein a first decision boundary 702 may be an adjustable threshold based on the misfit ratio as in the dotted line on the left depicted in FIG. 7. A second decision boundary may be another, higher threshold based on the misfit ratio as in the dotted line on the right depicted in FIG. 7. Herein, an adjustable threshold may be 75-25%, 25-10%, 10-1%, or 1-0.01% different than the misfit ratio. Weighting inversion coefficient winy may be calculated in equation (2):

$$winv = \begin{cases} 0 & \text{if } \mathrm{Ratio}_{misfit} < Thres1 \\ \dfrac{\mathrm{Ratio}_{misfit} - Thres1}{Thres2 - Thres1} & \text{if } Thres1 \le \mathrm{Ratio}_{misfit} \le Thres2 \\ 1 & \text{if } \mathrm{Ratio}_{misfit} > Thres2 \end{cases} \qquad \text{Equation (2)}$$

Herein, Thres1 is a first decision boundary, Thres2 is a second decision boundary, and $\mathrm{Ratio}_{misfit}$ is misfit ratio.

In block 810, products from the first inversion and the second inversion from blocks 804 and 806 may be combined using weighting inversion coefficient winy from block 810 to produce a final inversion result. Equation (3) shows how the two inversion solution may be combined.

$$dxo_{final} = winv \times dxo_{inv} \qquad \text{Equation (3)}$$

$$Rxo_{final} = winv \times Rxo_{inv} + (1 - winv) \times Rt_{n-inv}$$

$$Rt_{final} = winv \times Rt_{inv} + (1 - winv) \times Rt_{n-inv}$$

Herein, $dxo_{final}$ is the final inversion result for the invasion diameter, $Rxo_{final}$ is the final inversion result for the invasion zone resistivity, $Rt_{final}$ is the final inversion result for the formation resistivity, $dxo_{inv}$ is the inversion result for the invasion diameter with the invaded formation model of block 806, $Rxo_{inv}$ is the inversion result for the invasion zone resistivity with the invaded formation model of block 806, $Rt_{inv}$ is the inversion result for the formation resistivity with the invaded formation model of block 806, and $Rt_{n-inv}$ is the inversion result for the formation resistivity with the non-invaded formation model of block 804.

Figure 9A:
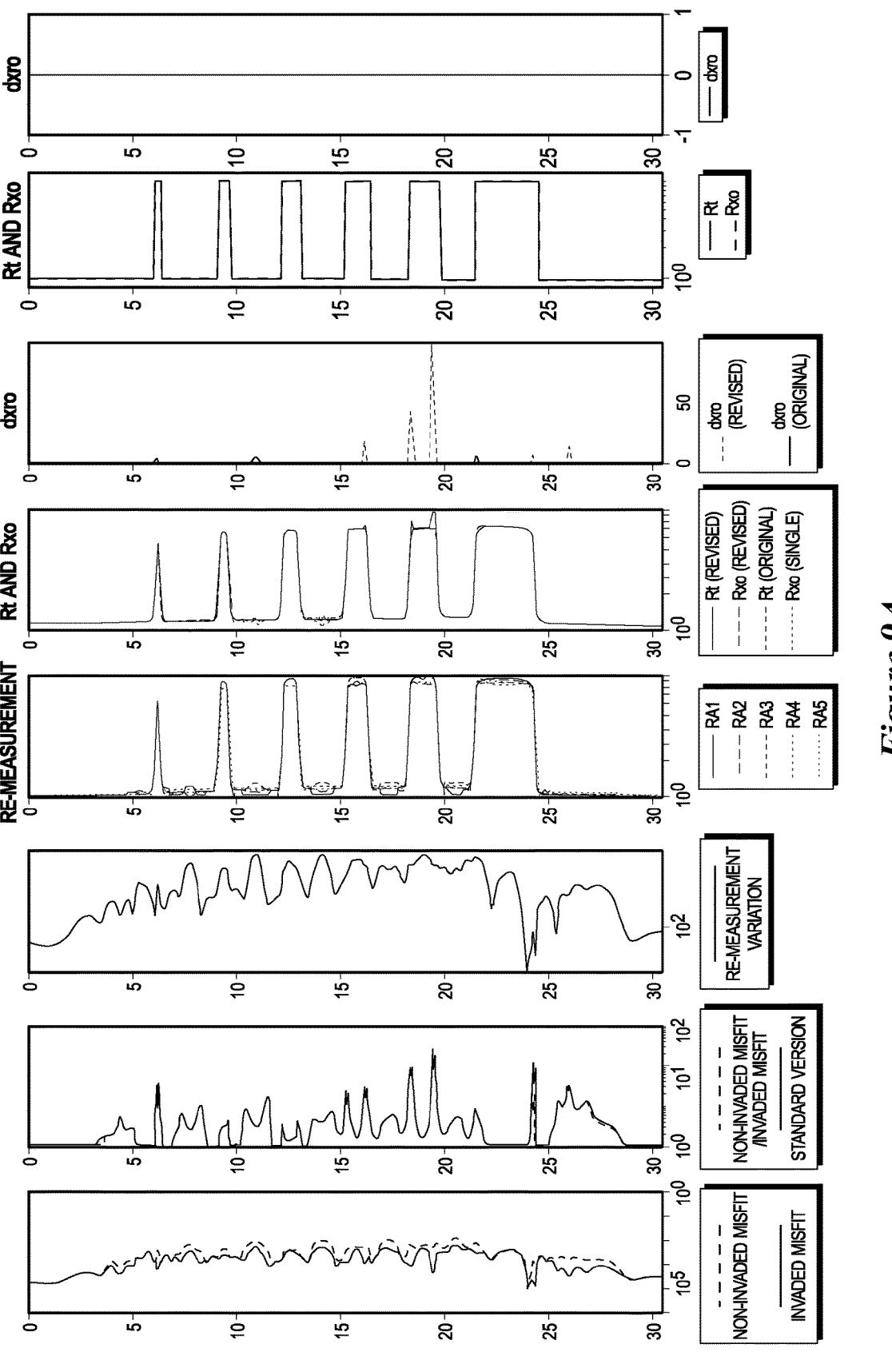
FIG. 9A illustrates a depth log of non-invaded true formation layer.
Figure 9B:
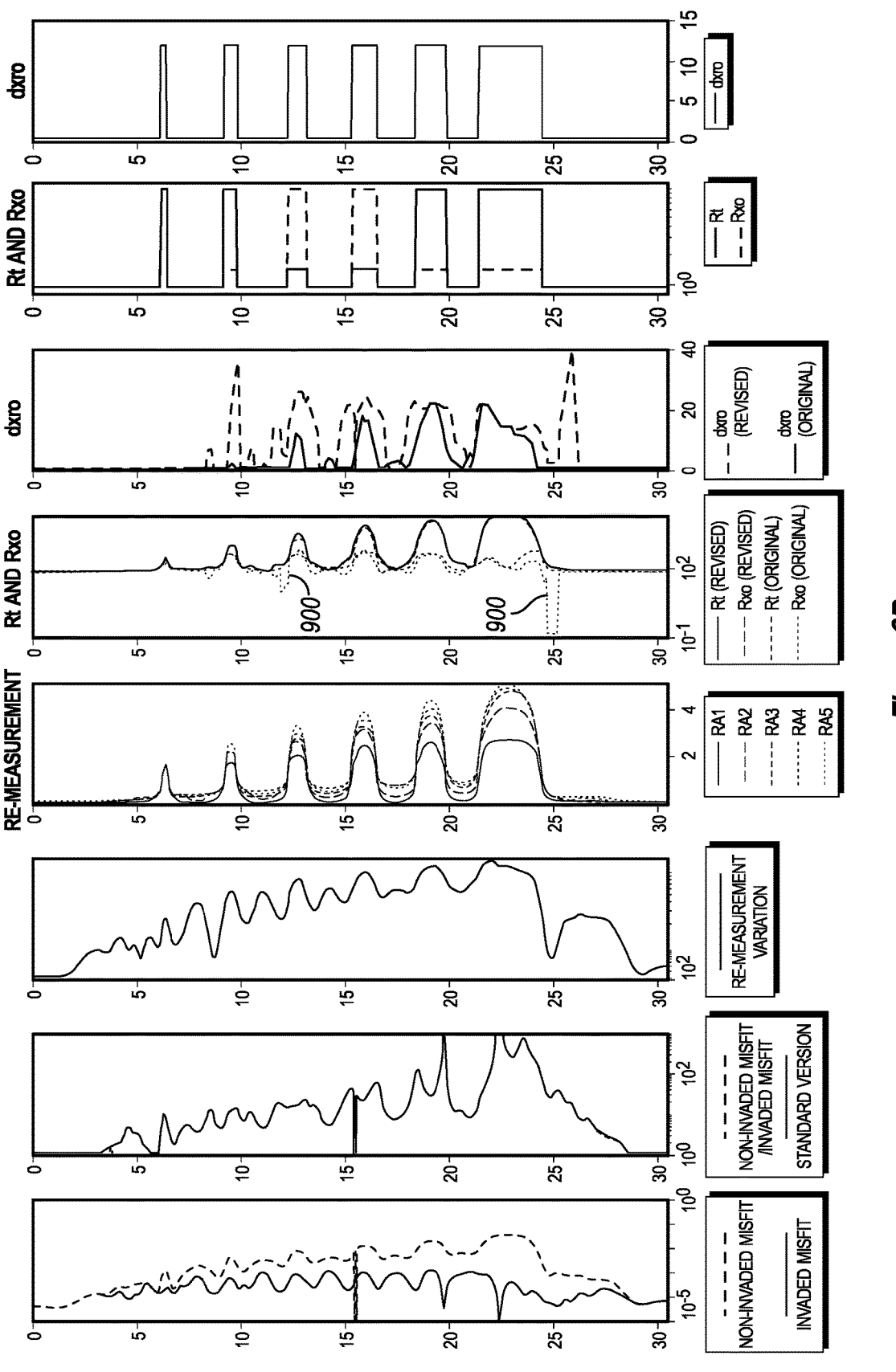
FIG. 9B illustrates a depth log of invaded formation layer.
Figure 9C:
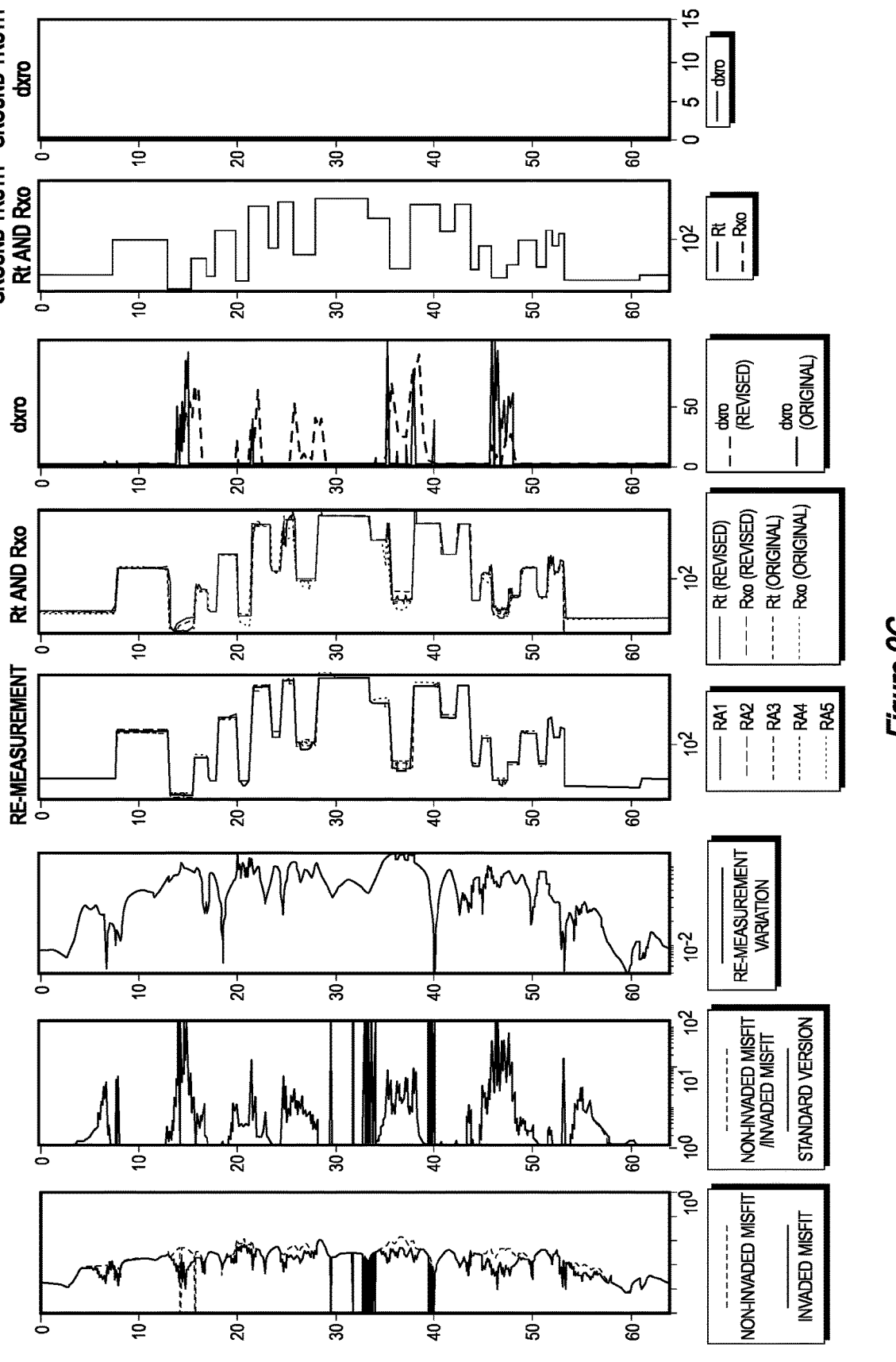
FIG. 9C illustrates a depth log of non-invaded true formation layer.
Figure 9D:
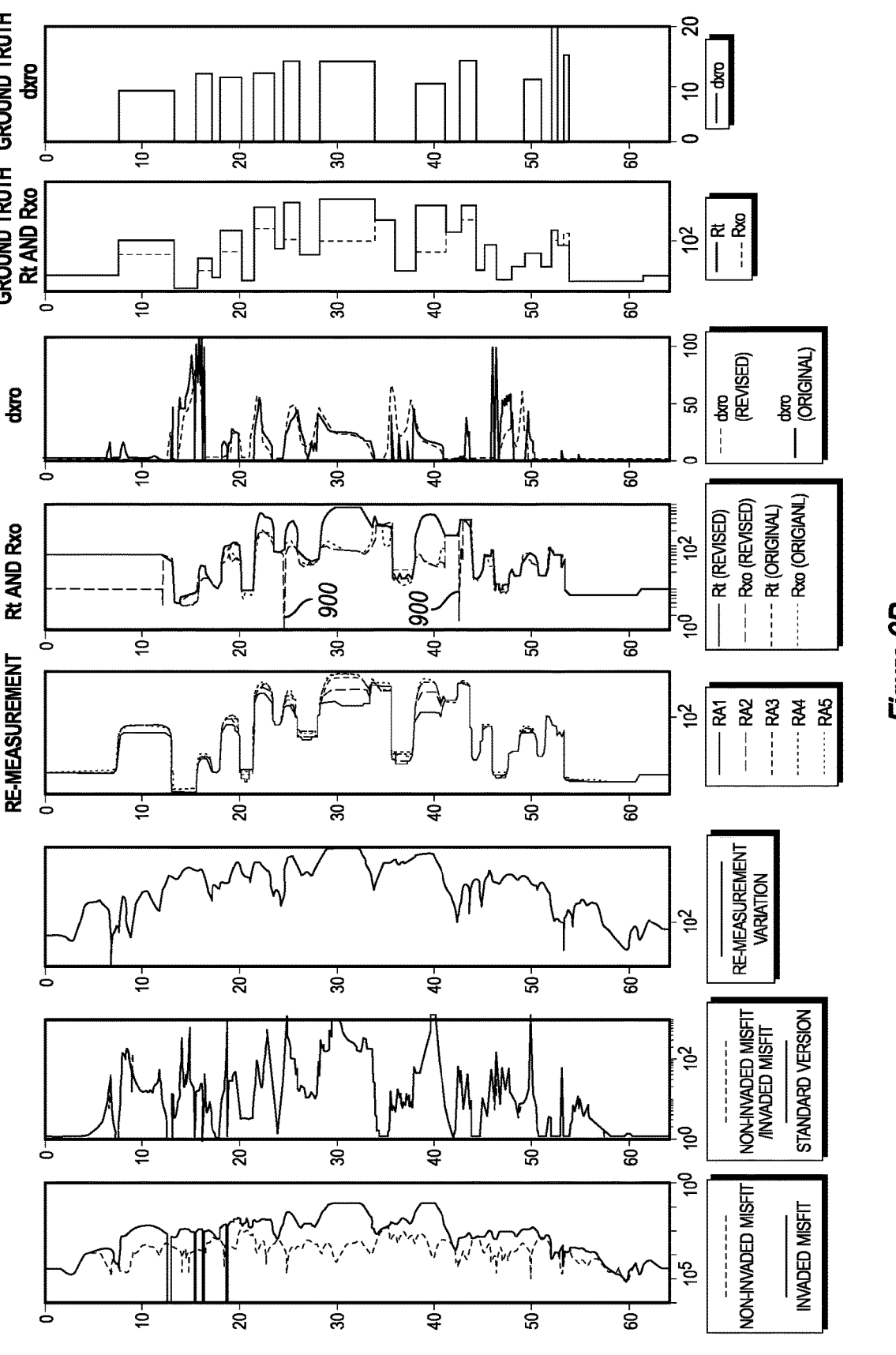
FIG. 9D illustrates a depth log of invaded formation layer.

FIG. 9A illustrates a log of non-invaded synthetic Chirp-type formation. FIG. 9B illustrates a log of invaded synthetic Chirp-type formation. FIG. 9C illustrates a log of non-invaded synthetic Oklahoma-type formation. FIG. 9D illustrates a log of invaded synthetic Oklahoma-type formation. In these plots, the first track shows the misfit of the non-invaded inversion (in red) and the misfit of the invaded inversion in blue. The second track is the ratio of the misfit of the non-invaded inversion and the invaded invasion. The third track shows the BC resistivity variation. The fourth track shows the measured apparent resistivities for the 5 different modes of an Array Laterolog tool. The fifth track shows a comparison of the final inverted $R_t$ and $R_{xo}$ using the method described herein with the results of the prior art method using the resistivity variation. The sixth track shows a comparison of the final inverted invasion diameter thickness $d_{xo}$ using the method described herein with the results of the prior art method using the resistivity variation. The seventh track shows the ground truth formation resistivity $R_t$ and invasion resistivity $R_{xo}$ values while the eight track shows the ground truth invasion diameter thickness $d_{xo}$ value. For all these plots, vertical axis indicates the depth. Results of the proposed inversion method described herein are more robust and is more consistent with the ground truth data in comparison with the prior art method.

In addition to the weights of the invaded and non-invaded inversion results, aforementioned regularization parameters applied during the inversion will have a significant impact on the inversion result. For example, difference between formation resistivity $R_t$ and invasion resistivity $R_{xo}$ may be constrained via regularization. Weaker regularization may result in thicker invasion diameter results and bigger differences between formation resistivity $R_t$ and invasion resistivity $R_{xo}$. Stronger regularization may result in thinner invasion diameter results and smaller differences between Rt and Rxo. Furthermore, if the regularization is weaker, the inversion results may become spiky. In FIGS. 9B and 9D, spikes 900 may be present in invasion resistivity $R_{xo}$ results at varying depths due to weaker regularization. Additionally, spikes 900 may be present for formation resistivity $R_t$, invasion diameter thickness $d_{xo}$, and/or other inverted parameters such as tool eccentricity. Users may adjust the regularization parameters manually to reduce the spikes. In examples, an automatic adjustment of regularization parameters may be implemented to reduce the user-program interaction and the subjectivity of the inversion results. Data buffering may also be used to constrain the inversion results based on the results of the previous logging points and reduce the spikes.

Figure 10:
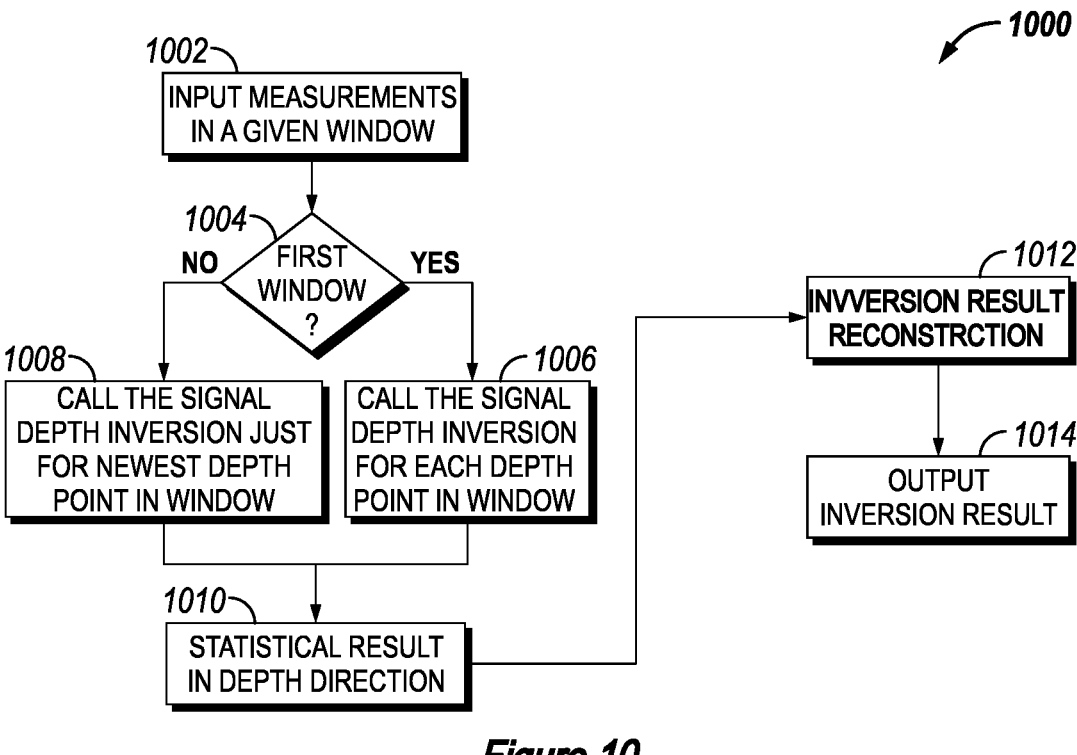
FIG. 10 illustrates depth buffering workflow.

FIG. 10 illustrates depth buffering workflow 1000 to reduce spiky inversion results. In examples, depth buffering workflow 1000 may be implemented on information handling system 114. In block 1002, one or more input measurements at one or more windows may be acquired and stored in a buffer window of an adjustable size. In examples, one or more input measurements may comprise one or more functions of current, resistivity, and/or voltage, as described in block 802 (e.g., referring to FIG. 8). In examples, the buffer may be filled with input measurements until it is filled for the first time. This may be referred to as the first window. After the first window is passed on to block 1004, the set of input measurements from the next depth point may be added to the buffer by replacing the first set of input measurements corresponding to the first depth point input into the buffer. Thus, buffer in block 1002 may be a First In First Out (FIFO) type buffer. In block 1004, if one or more input measurements are from the first window, depth buffering workflow 1000 proceeds to block 1006, otherwise depth buffering workflow 1000 proceeds to block 1008. In block 1006, an inversion may be performed on the one or more input measurements. The inversion from block 1006 may comprise at least part of inversion algorithm workflow 800 (e.g., referring to FIG. 8). In examples, the input for block 1006 may comprise one or more input measurements for all the depth points within the first window as described in block 1002. Additionally, the output for block 1006 may comprise at least invasion resistivity $R_{xo}$, formation resistivity $R_t$, mud resistivity $R_m$, and/or invasion diameter thickness $d_{xo}$ for each of the depth points within the window. In block 1008, inversion algorithm workflow 800 may be applied as described in block 1006. However, to reduce the amount of the computation and utilize the fact a single depth point is added to the buffer for a new window, only the inversion outputs for that single depth point may be calculated. These inversion outputs may include invasion resistivity $R_{xo}$, formation resistivity $R_t$, mud resistivity $R_m$, and/or invasion diameter thickness $d_{xo}$ for that added depth point. For the other depth points common with the previous windows, previously calculated inversion outputs may be utilized. In block 1010, a statistical analysis may be performed on the one or more inversion products for all the depth points within the window. A statistical analysis may comprise a median calculation, a mean calculation or any other statistical data operation. In block 1012, inversion results reconstruction may be performed and comprise statistical calculations of block 1010 may be used remove one or more spikes 900 (e.g., referring to FIG. 9) as described above. The product of block 1012 may be one or more clean inversion products for all the depth points within the window. Herein, inversion products may comprise diameter thickness $d_{bh}$ and invasion diameter thickness $d_{xo}$ comprising mud resistivity $R_m$, invasion resistivity $R_{xo}$, and/or formation resistivity $Rt_{final}$. This process is referred to as the inversion results reconstruction. In block 1014, outputting inversion results may comprise determining mud layer diameter thickness $d_{bh}$ and invasion diameter thickness $d_{xo}$ comprising mud resistivity $R_m$, invasion resistivity $R_{xo}$, and/or formation resistivity $R_t$ from block 1010 at a single depth. This single depth may be the depth point at the center of the window. Depth points at the beginning and end of the logs may be discarded since they are never at the center of a buffer window. In other implementations, they may be processed in a special manner by extending the buffer using the measurements of the first logging point for the depth points at the beginning of the log and last logging point for the depth points at the end of the log as it is well known in the art. Depth buffering workflow 1000 is one way to reduce spikes in the inversion. Further, as previously mentioned, regularization parameters may be adjusted to further reduce the spikes. Regularization parameters may be autotuned to reduce the subjectivity of the results.

Figure 11:
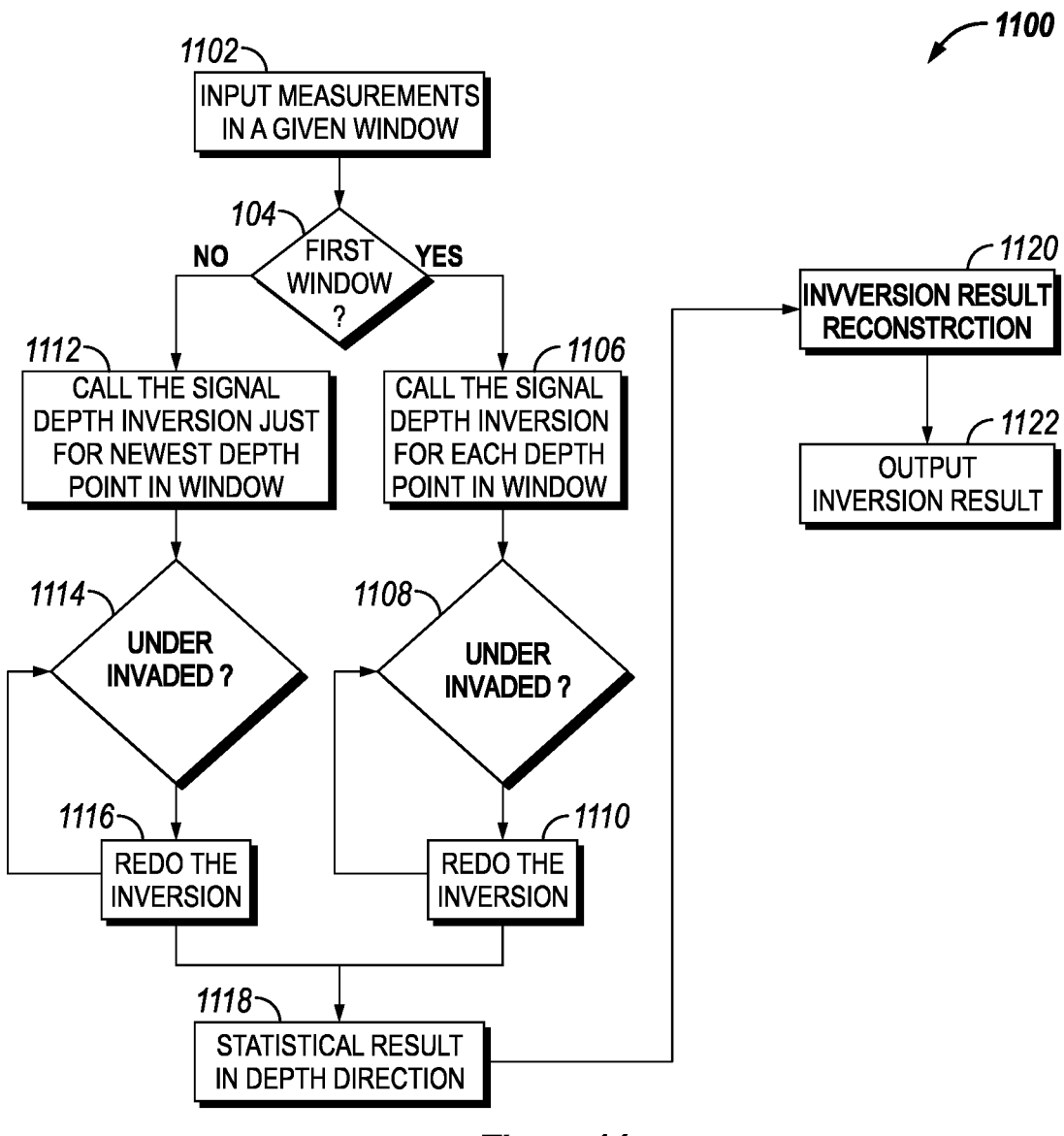
FIG. 11 illustrates depth buffering and autotuning workflow.

FIG. 11 illustrates depth buffering and regularization autotuning workflow 1100 to reduce spiky inversion results. This workflow incorporates all the steps of workflow 1000 and includes additional regularization autotuning steps. In examples, depth buffering and regularization autotuning workflow 1100 may be implemented on information handling system 114. In block 1102, measurements may be stored in a buffer window of a certain size. In examples, one or more input measurements may comprise one or more functions of current, resistivity, and/or voltage, as described in block 802 (e.g., referring to FIG. 8). Buffer may be filled with input measurements until it is filled for the first time. This may be referred to as the first window. After the first window is passed on to block 1104, the set of input measurements from the next depth point may be added to the buffer by replacing the first set of input measurements corresponding to the first depth point inputted to the buffer. Thus, buffer in block 1102 may be a First In First Out (FIFO) type buffer. In block 1104, if one or more input measurements are from the first window, depth buffering workflow 1100 proceeds to block 1106, otherwise depth buffering workflow 1100 proceeds to block 1112. In block 1106, an inversion may be performed on the one or more input measurements. The inversion from block 1106 may comprise at least part of inversion algorithm workflow 800 (e.g., referring to FIG. 8). In examples, the input for block 1106 may comprise one or more input measurements for all the depth points within the first window as described in block 1102. Additionally, the output for block 1106 may comprise at least invasion resistivity $R_{xo}$, formation resistivity $R_t$, mud resistivity $R_m$, and/or invasion diameter thickness $d_{xo}$ for each of the depth points within the window. In block 1108, it may be determined if the inversion product from block 1106 is under invaded due to a strong regularization. Determining whether the solution is under invaded may be performed by comparing the data misfit ratio of the inversion with the non-invaded model and the inversion of the invaded model with no regularization to Thres2 of Equation 2. A flag may be formed for each depth point in the window based on this ratio being over Thres2 which indicates invasion being present. Then, this flag may be compared with the final inversion result with regularization. If the final inversion result at a depth point produces a nonnegligible invasion (for example, over 1 inches of diameter), then the final inversion result may be deemed to be invaded. Otherwise, final inversion result may be deemed to be non-invaded. Thus, for the depth points within the window, percentage of the depth points that flag indicates invasion while the final inversion result does not indicate an inversion may be calculated. If the amount of points where the final inversion does not indicate an invasion while the flag indicates an inversion is above another adjustable threshold (this threshold may be named as $Thres_{inv}$), it may be determined that this is a case where the regularization is too strong and the final results are under-invaded. In examples, the adjustable threshold may more than 50% difference, more than 10% difference, more than 1% difference, or more than 0.1% difference. In block 1110, if it is determined that inversion results are under-invaded, regularization parameter may be relaxed (for example, by decreasing it a certain predetermined amount such as making it half the previous value), inversion is reperformed with the relaxed regularization and under-invasion check in block 1008 is performed again until satisfactory results are achieved. When the check in block 1008 indicates no under-invasion, inversion may proceed to block 1118. In block 1112, inversion algorithm workflow 800 may be applied as described in block 1106. However, to reduce the amount of the computation and utilize the fact a single depth point is added to the buffer for a new window, only the inversion outputs for that single depth point may be calculated. These inversion outputs may include invasion resistivity $R_{xo}$, formation resistivity $R_t$, mud resistivity $R_m$, and/or invasion diameter thickness $d_{xo}$ for that added depth point. For the other depth points common with the previous windows, previously calculated inversion outputs may be utilized. In block 1114, an under-invasion check is performed in the current window in exactly the same manner as performed in 1108. In block 1116, if it is determined that inversion results are under-invaded, regularization parameter may be relaxed, inversion is reperformed with the relaxed regularization and under-invasion check in block 1114 is performed again until satisfactory results are achieved. When the check in block 1114 indicates no under-invasion, inversion may proceed to block 1118. In block 1118, a statistical analysis may be performed on the one or more inversion products for all the depth points within the window. A statistical analysis may comprise a median calculation, a mean calculation or any other statistical data operation to. In block 1120, the statistical calculations of block 1118 may be used remove one or more spikes 900 (e.g., referring to FIG. 9) as described above. The product of block 1120 may be one or more clean inversion products for all the depth points within the window. This process is referred to as the inversion results reconstruction. In block 1122, outputting inversion results may comprise determining mud layer diameter thickness $d_{bh}$ and invasion diameter thickness $d_{xo}$ comprising mud resistivity $R_m$, invasion resistivity $R_{xo}$, and/or formation resistivity $R_t$ from block 1110 at a single depth.

Figure 12:
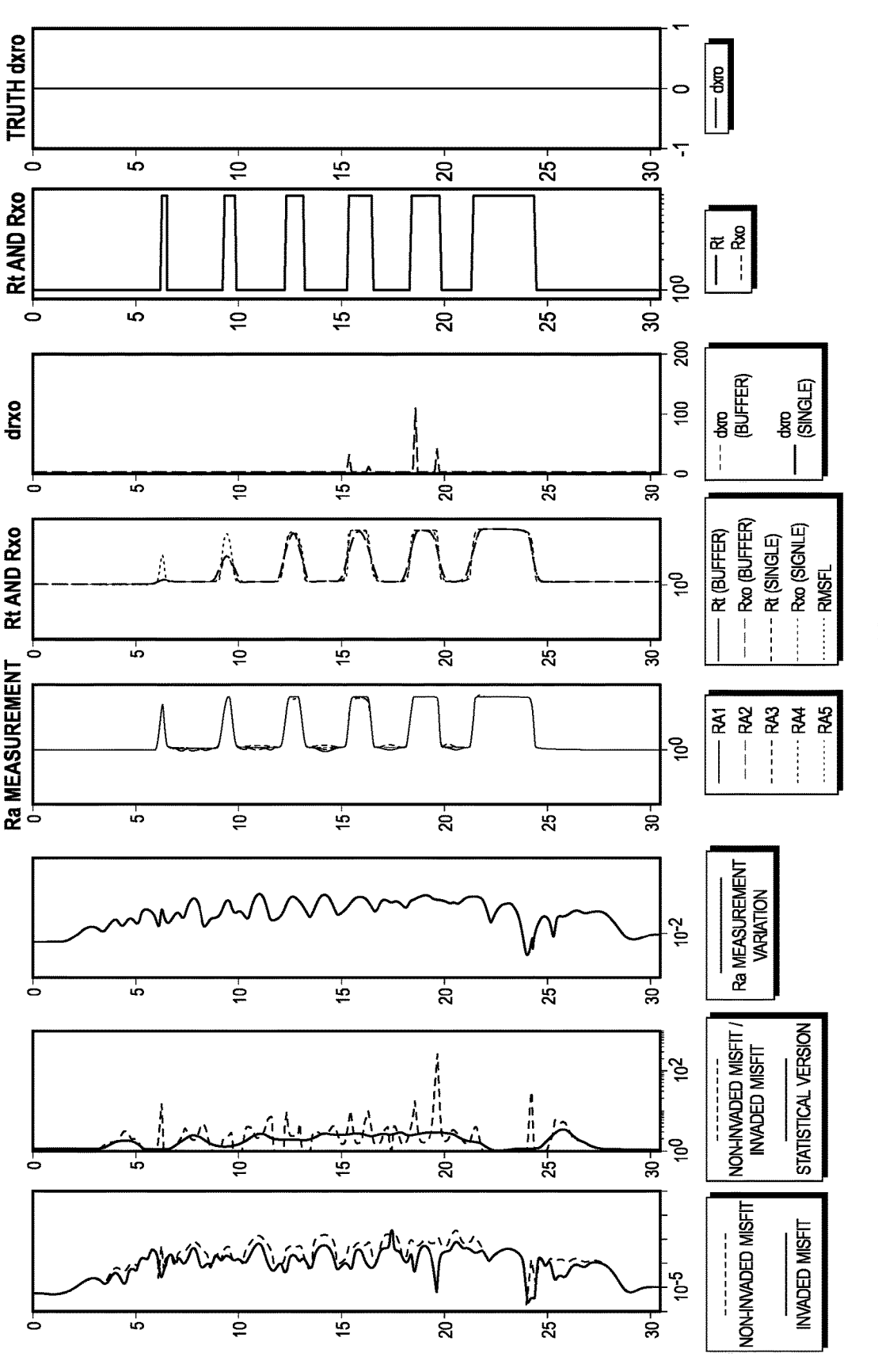
FIG. 12 illustrates a first synthetical measurement set of an uninvaded formation.

FIG. 12 illustrates a first synthetical measurement set of an uninvaded formation. In examples, formation resistivity $R_t$, invasion resistivity $R_{xo}$, and diameter thickness $d_{xo}$ vs depth may be plotted. The measurement set may be a first synthetical measurement set of an uninvaded formation. Synthetic measurements may be processed into formation resistivity $Rt_{final}$, invasion resistivity $R_{xo}$, and diameter thickness $d_{xo}$ as described in workflow 1000 (e.g., referring to FIG. 10).

Figure 13:
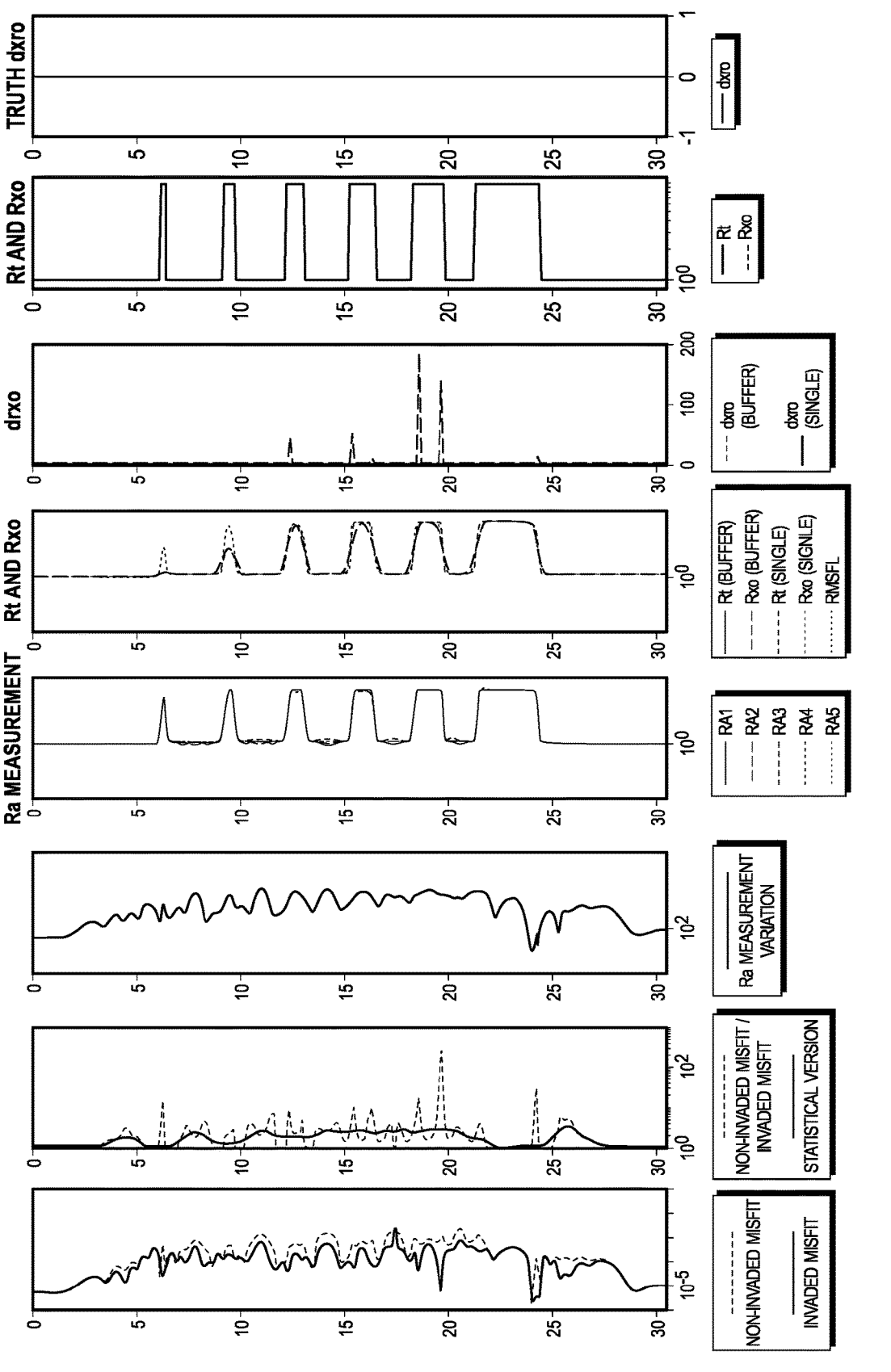
FIG. 13 illustrates a first synthetical measurement set of an uninvaded formation with autotuning processing.

FIG. 13 illustrates a first synthetical measurement set of an uninvaded formation. In examples, formation resistivity $R_t$, invasion resistivity $R_{xo}$, and diameter thickness $d_{xo}$ vs depth may be plotted. The measurement set may be a first synthetical measurement set of an uninvaded formation. Synthetic measurements may be processed into formation resistivity $R_t$, invasion resistivity $R_{xo}$, and diameter thickness $d_{xo}$ as described in workflow 1100 (e.g., referring to FIG. 11).

Figure 14:
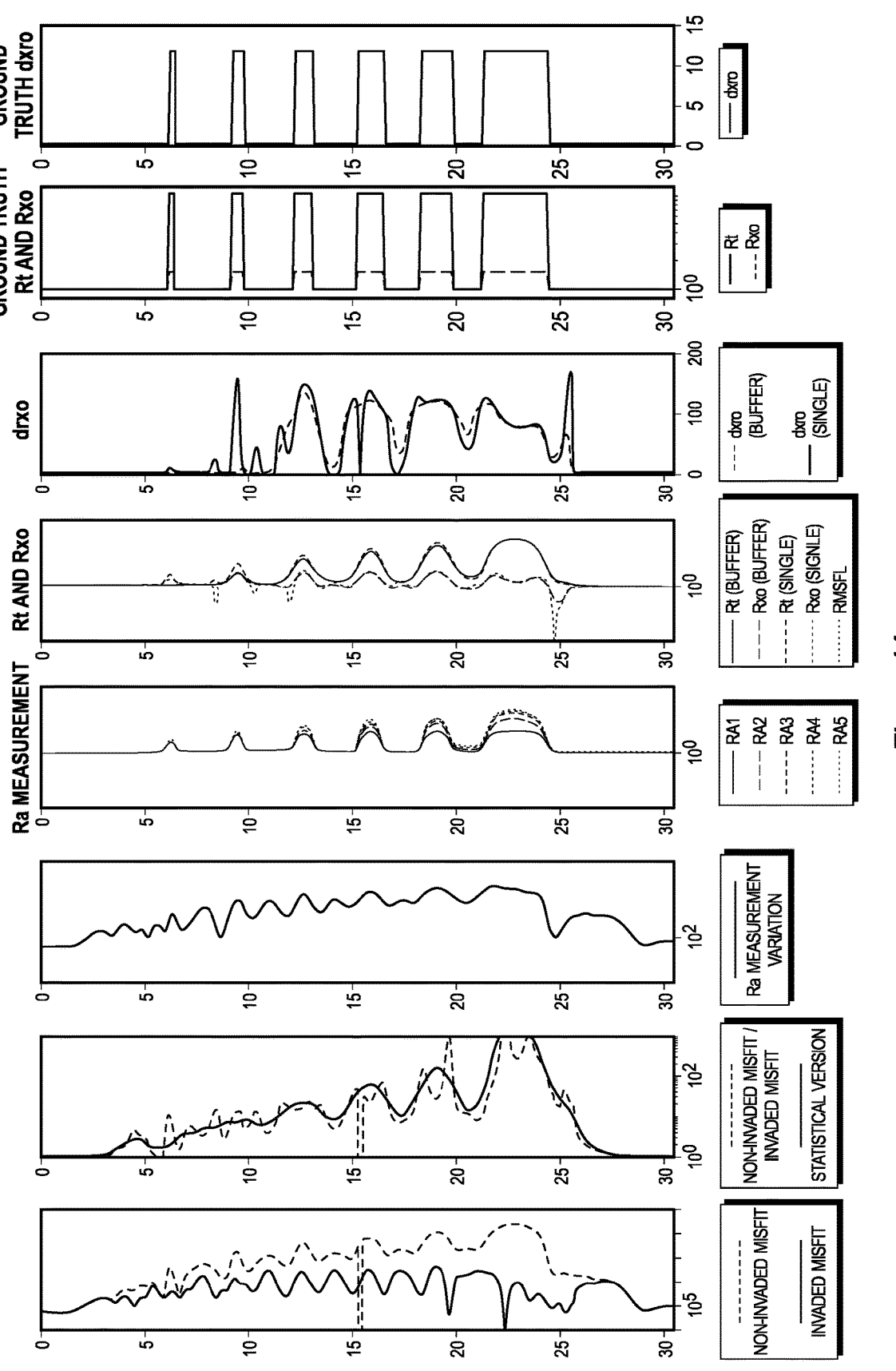
FIG. 14 illustrates a second synthetical measurement set of an invaded formation.

FIG. 14 illustrates a second synthetical measurement set of an invaded formation. In examples, formation resistivity $R_t$, invasion resistivity $R_{xo}$, and diameter thickness $d_{xo}$ vs depth may be plotted. The measurement set may be a second synthetical measurement set of an invaded formation. Synthetic measurements may be processed into formation resistivity $R_t$, invasion resistivity $R_{xo}$, and diameter thickness $d_{xo}$ as described in workflow 1000 (e.g., referring to FIG. 10).

Figure 15:
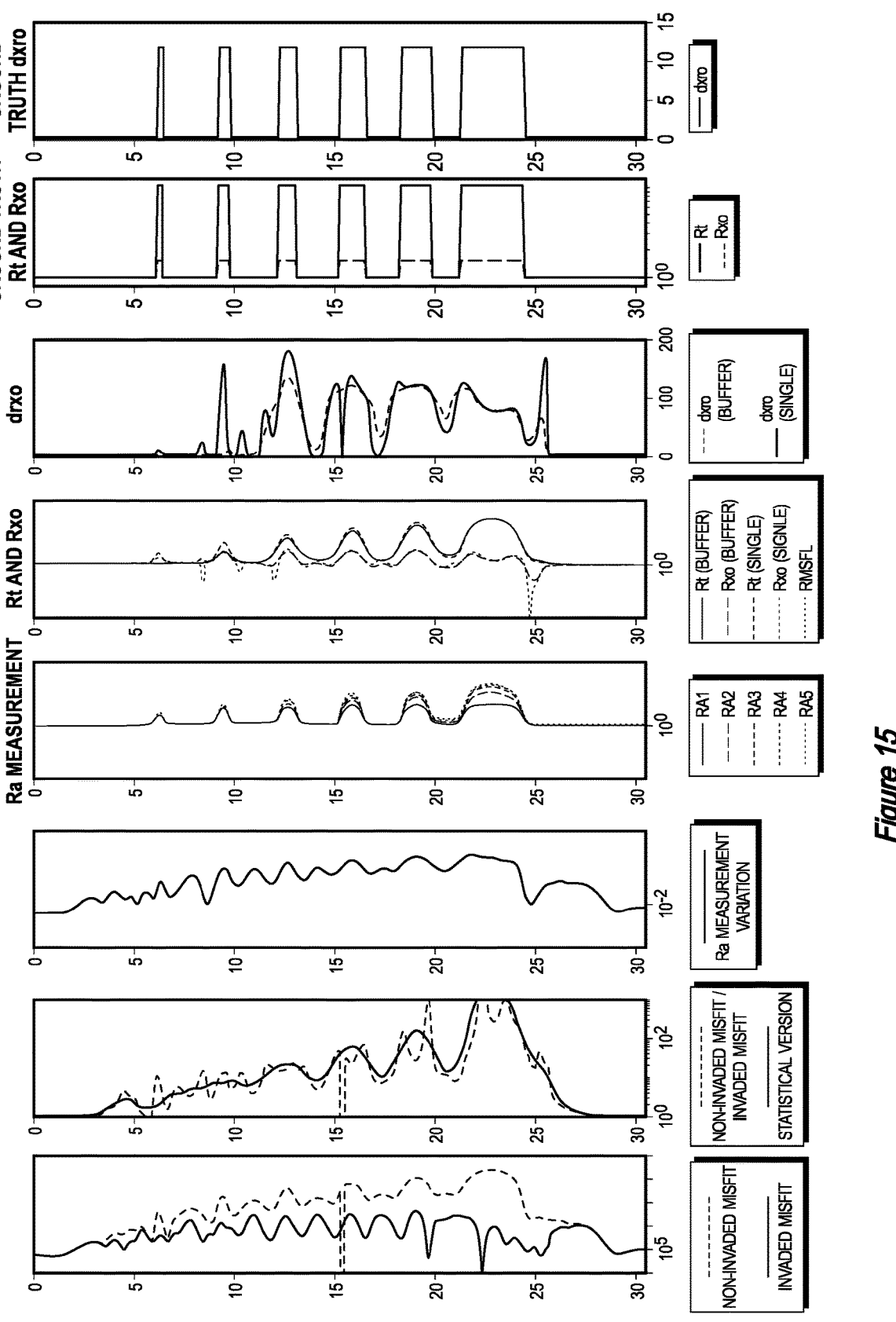
FIG. 15 illustrates a second synthetical measurement set of an invaded formation with autotuning processing.

FIG. 15 illustrates a second synthetical measurement set of an invaded formation. In examples, formation resistivity $R_t$, invasion resistivity $R_{xo}$, and diameter thickness $d_{xo}$ vs depth may be plotted. The measurement set may be a second synthetical measurement set of an invaded formation. Synthetic measurements may be processed into formation resistivity $R_t$, invasion resistivity $R_{xo}$, and diameter thickness $d_{xo}$ as described in workflow 1100 (e.g., referring to FIG. 11).

Figure 16:
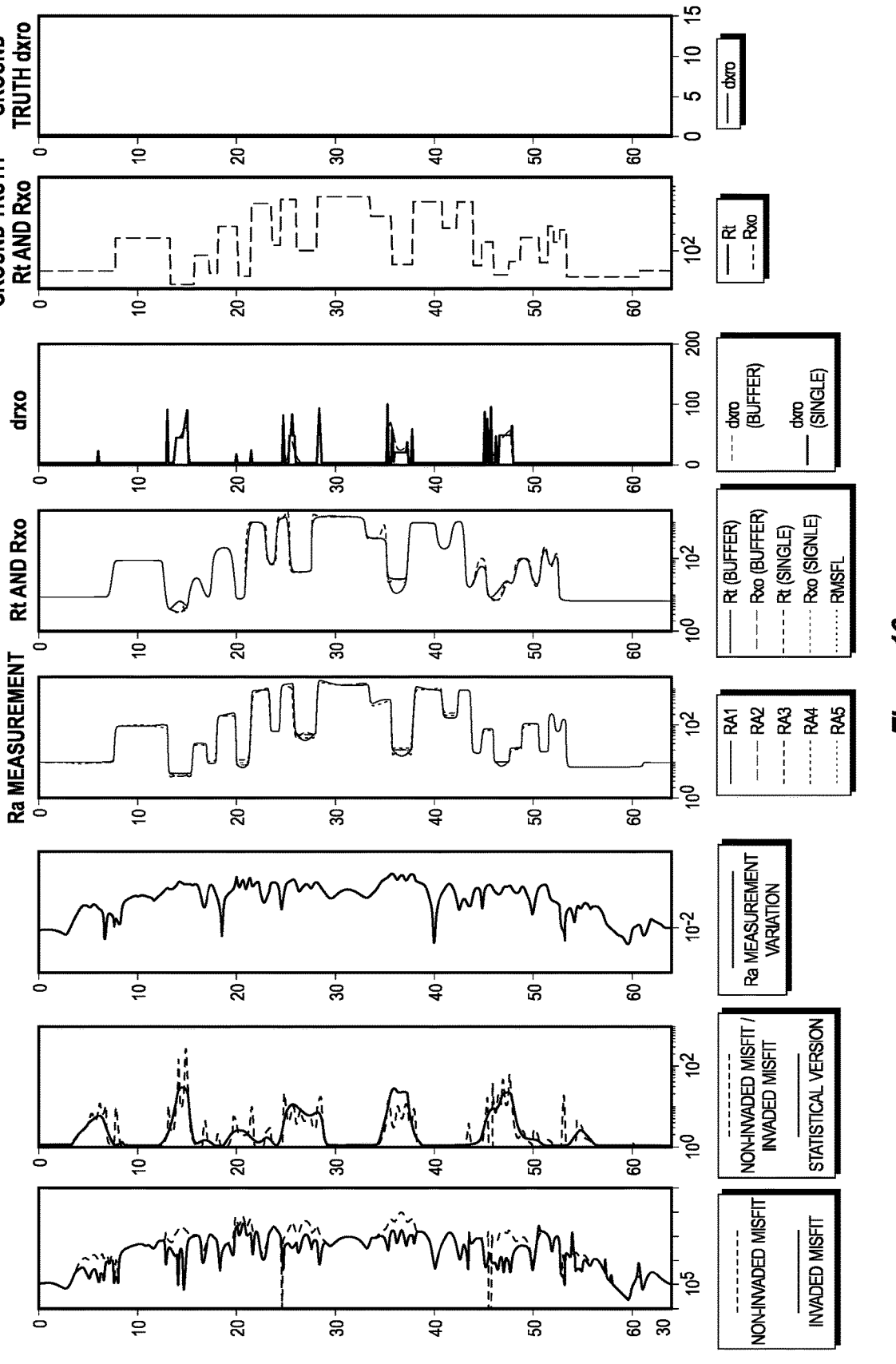
FIG. 16 illustrates a third synthetical measurement set of an uninvaded formation.

FIG. 16 illustrates a third synthetical measurement set of an uninvaded formation. In examples, formation resistivity $R_t$, invasion resistivity $R_{xo}$, and diameter thickness $d_{xo}$ vs depth may be plotted. The measurement set may be a third synthetical measurement set of an uninvaded formation. Synthetic measurements may be processed into formation resistivity $R_t$, invasion resistivity $R_{xo}$, and diameter thickness $d_{xo}$ as described in workflow 1000 (e.g., referring to FIG. 10).

Figure 17:
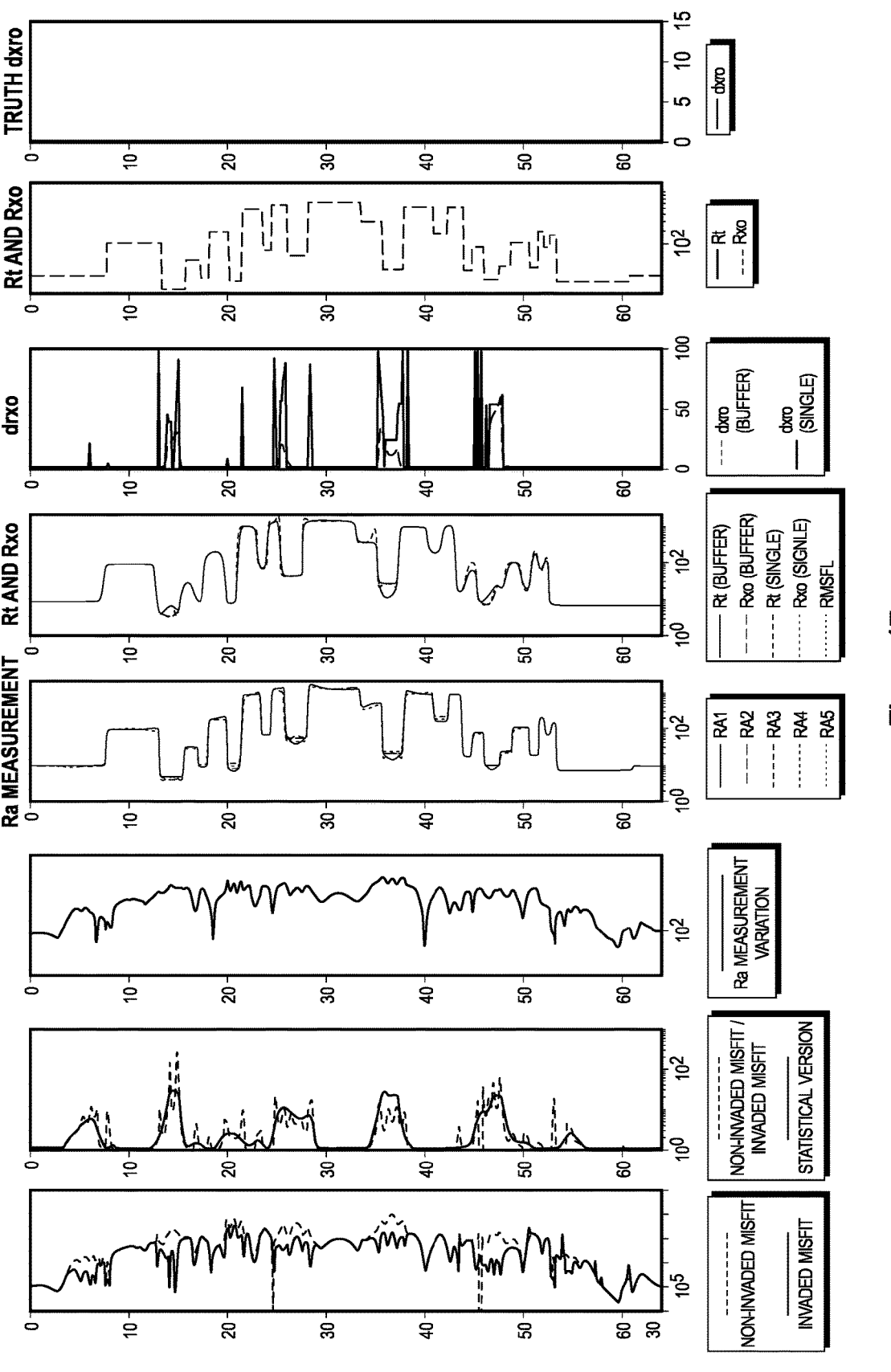
FIG. 17 illustrates a third synthetical measurement set of an uninvaded formation with autotuning processing.

FIG. 17 illustrates a third synthetical measurement set of an uninvaded formation. In examples, formation resistivity $R_t$, invasion resistivity $R_{xo}$, and diameter thickness $d_{xo}$ vs depth may be plotted. The measurement set may be a third synthetical measurement set of an uninvaded formation. Synthetic measurements may be processed into formation resistivity $R_t$, invasion resistivity $R_{xo}$, and diameter thickness $d_{xo}$ as described in workflow 1100 (e.g., referring to FIG. 11).

Figure 18:
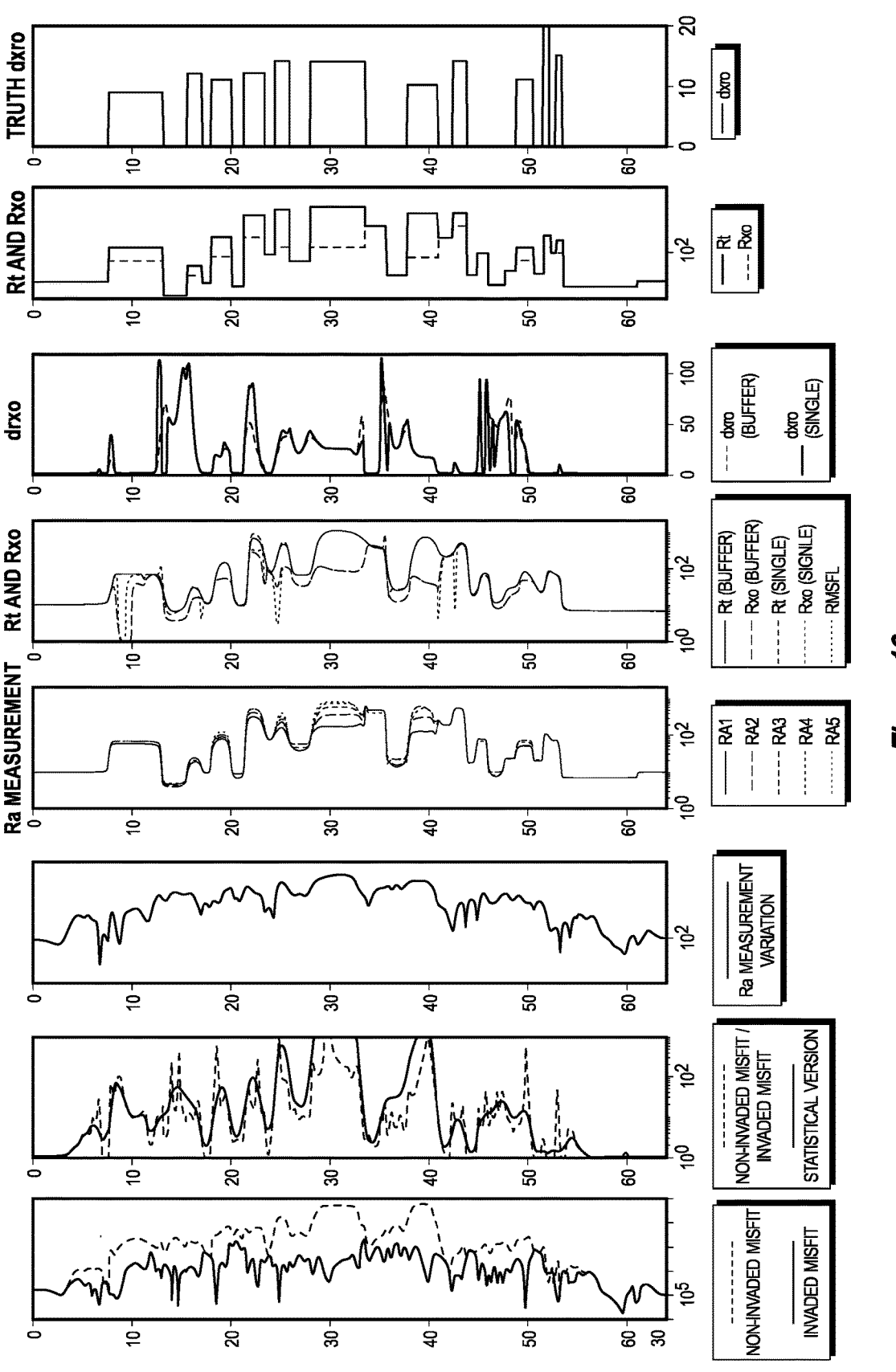
FIG. 18 illustrates a fourth synthetical measurement set of an invaded formation.

FIG. 18 illustrates a fourth synthetical measurement set of an invaded formation. In examples, formation resistivity $R_t$, invasion resistivity $R_{xo}$, and diameter thickness $d_{xo}$ vs depth may be plotted. The measurement set may be a fourth synthetical measurement set of an invaded formation. Synthetic measurements may be processed into formation resistivity $R_t$, invasion resistivity $R_{xo}$, and diameter thickness $d_{xo}$ as described in workflow 1000 (e.g., referring to FIG. 10).

Figure 19:
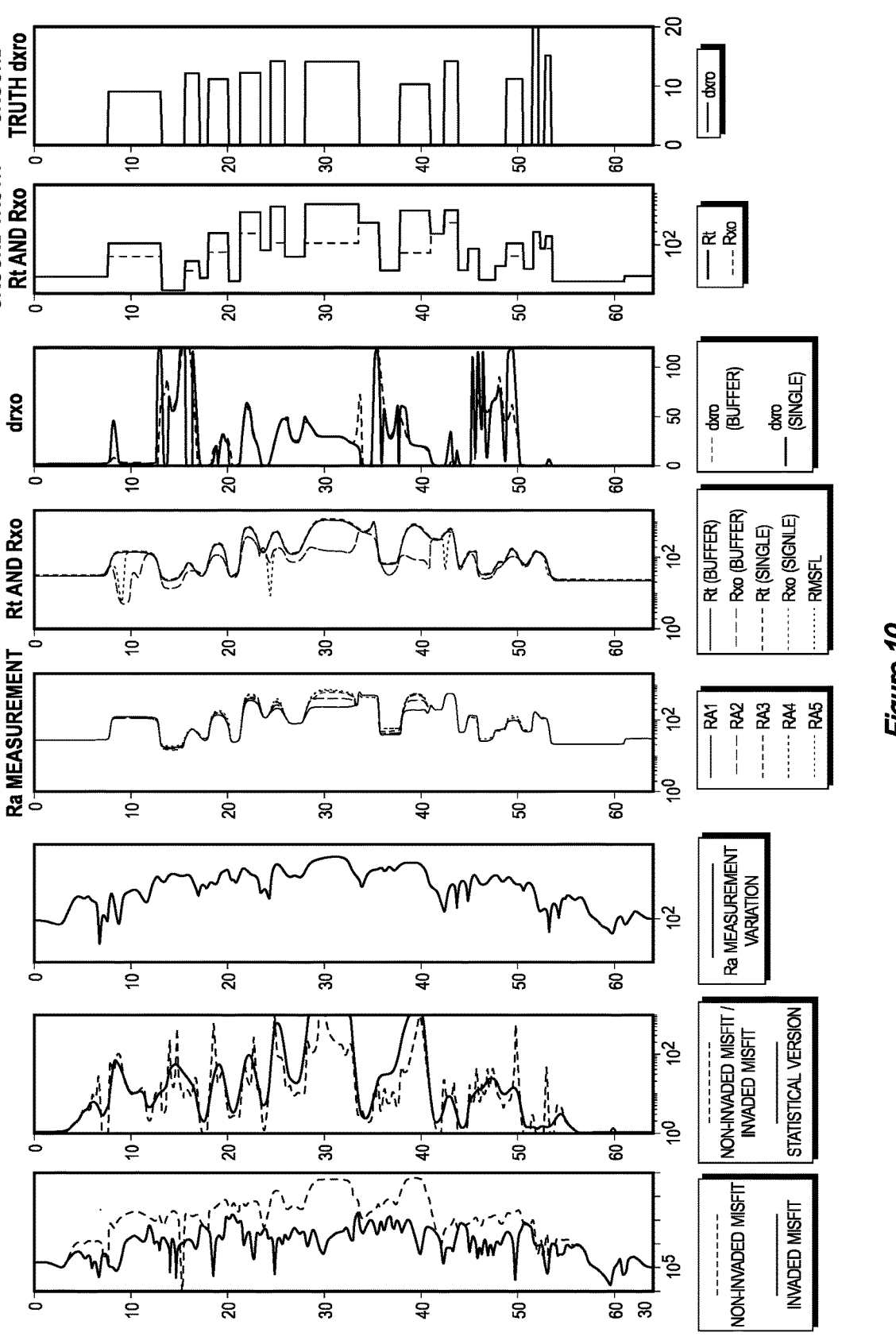
FIG. 19 illustrates a fourth synthetical measurement set of an invaded formation with autotuning processing.

FIG. 19 illustrates a fourth synthetical measurement set of an invaded formation. In examples, formation resistivity $R_t$, invasion resistivity $R_{xo}$, and diameter thickness $d_{xo}$ vs depth. The measurement set may be a fourth synthetical measurement set of an invaded formation may be plotted. Synthetic measurements may be processed into formation resistivity $R_t$, invasion resistivity $R_{xo}$, and diameter thickness $d_{xo}$ as described in workflow 1100 (e.g., referring to FIG. 11).

Figure 20:
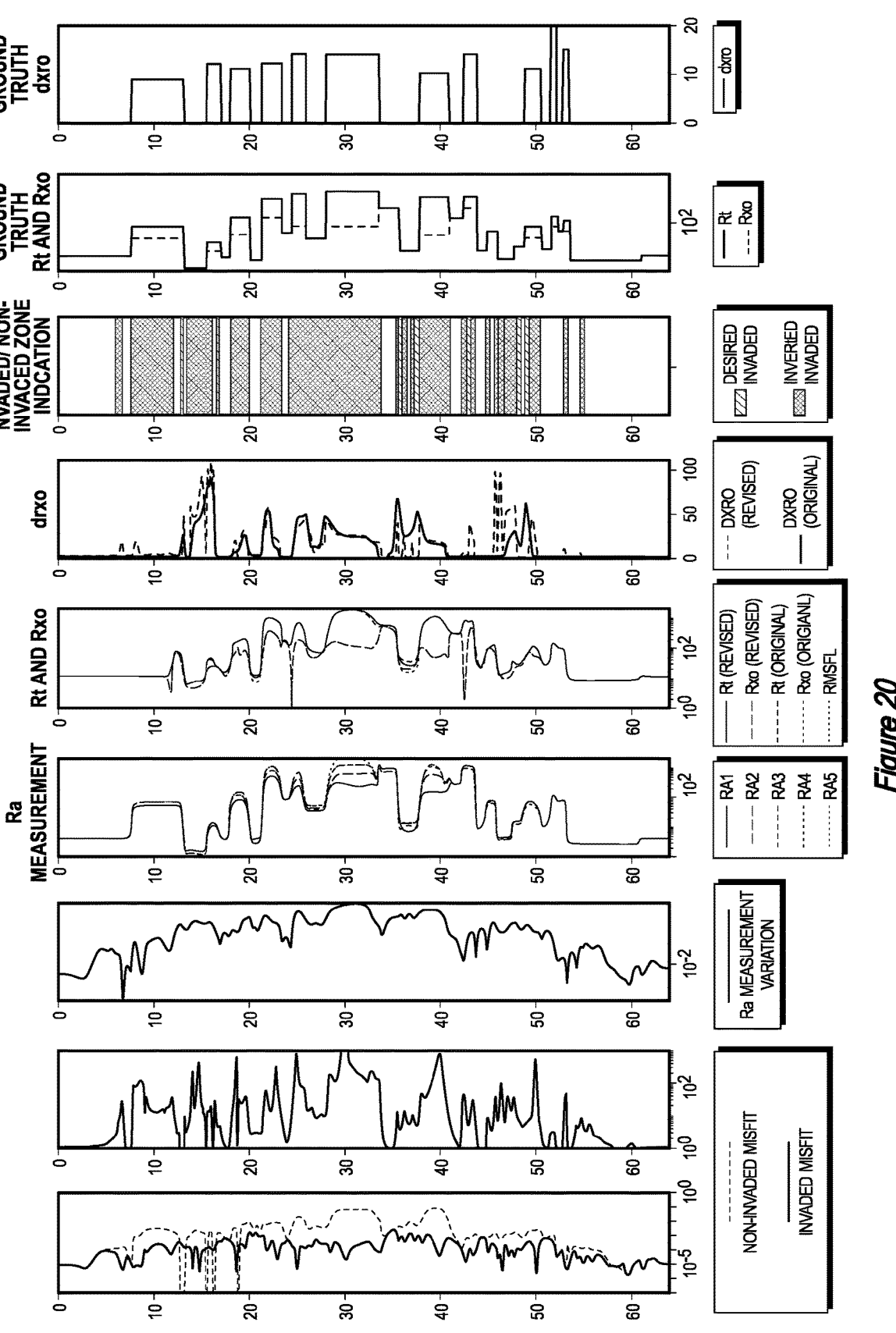
FIG. 20 illustrates inversion indication displays for single depth point inversion.

FIG. 20 illustrates inversion indication displays for single depth point inversion as shown in workflow 1000 (e.g., referring to FIG. 10). For example, in the 7th column, ideal invasion zones 2002 and actual inversion result 2004. If there are some ideal invasion zones 2002, it may indicate that the regularization coefficient is high. This concept may be shown in the comparison described in block 1108 and block 1114. Hence, although the data misfit's metric show there are some invasions, however the actual inversion result does not prove it.

Figure 21:
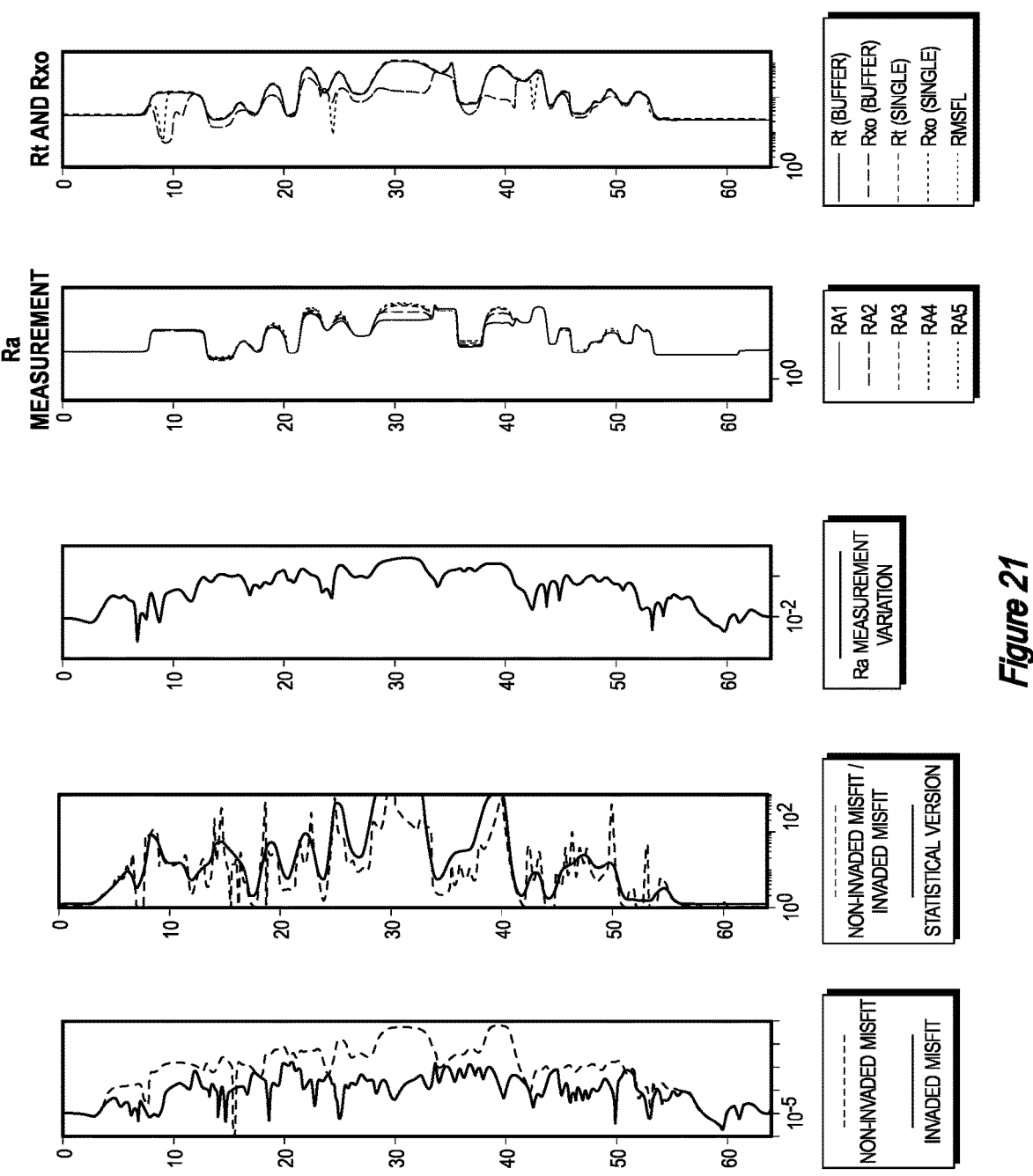
FIG. 21 illustrates inversion indication displays for depth buffering inversion.

FIG. 21 illustrates inversion indication displays for depth buffering inversion as shown in workflow 1100 (e.g., referring to FIG. 11). For example, in the 7th column ideal invasion zones 2002 and actual inversion result 2004. If there are some ideal invasion zones 2002, it may indicate that the regularization coefficient is high. Just as described above in FIG. 20, the regularization coefficient may be too harsh in some depth ranges. This concept may be shown in the comparison described in block 1108 and block 1114. Hence although the data misfit's metric show there are some invasions.

As illustrated, communication link 140 (which may be wired or wireless, for example) may be provided that may transmit data from BHA 130 to an information handling system 114 at information handling system 114. Information handling system 114 may include a personal computer 141, a video display 142, a keyboard 144 (i.e., other input devices.), and/or non-transitory computer-readable media 146 (e.g., optical disks, magnetic disks) that can store code representative of the methods described herein. In addition to, or in place of processing at surface 108, processing may occur downhole.

Figure 22:
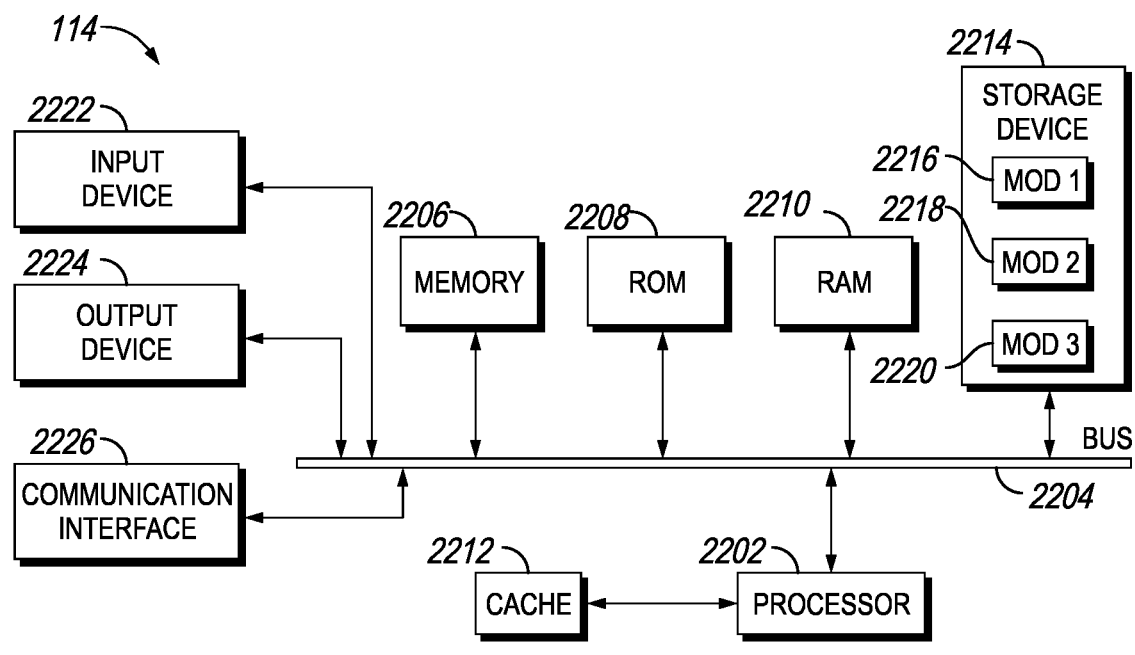
FIG. 22 illustrates an example information handling system.

FIG. 22 illustrates an example information handling system 114 which may be employed to perform various steps, methods, and techniques disclosed herein. Persons of ordinary skill in the art will readily appreciate that other system examples are possible. As illustrated, information handling system 114 includes a processing unit (CPU or processor) 2202 and a system bus 2204 that couples various system components including system memory 2206 such as read only memory (ROM) 2208 and random-access memory (RAM) 2210 to processor 2202. Processors disclosed herein may all be forms of this processor 2202. Information handling system 114 may include a cache 2212 of high-speed memory connected directly with, in close proximity to, or integrated as part of processor 2202. Information handling system 114 copies data from memory 2206 and/or storage device 2214 to cache 2212 for quick access by processor 2202. In this way, cache 2212 provides a performance boost that avoids processor 2202 delays while waiting for data. These and other modules may control or be configured to control processor 2202 to perform various operations or actions. Another system memory 2206 may be available for use as well. Memory 2206 may include multiple different types of memory with different performance characteristics. It may be appreciated that the disclosure may operate on information handling system 114 with more than one processor 2202 or on a group or cluster of computing devices networked together to provide greater processing capability. Processor 2202 may include any general-purpose processor and a hardware module or software module, such as first module 2216, second module 2218, and third module 2220 stored in storage device 2214, configured to control processor 2202 as well as a special-purpose processor where software instructions are incorporated into processor 2202.

Processor 2202 may be a self-contained computing system, containing multiple cores or processors, a bus, memory controller, cache, etc. A multi-core processor may be symmetric or asymmetric. Processor 2202 may include multiple processors, such as a system having multiple, physically separate processors in different sockets, or a system having multiple processor cores on a single physical chip. Similarly, processor 2202 may include multiple distributed processors located in multiple separate computing devices but working together such as via a communications network. Multiple processors or processor cores may share resources such as memory 2206 or cache 2212 or may operate using independent resources. Processor 2202 may include one or more state machines, an application specific integrated circuit (ASIC), or a programmable gate array (PGA) including a field PGA (FPGA).

Each individual component discussed above may be coupled to system bus 2204, which may connect each and every individual component to each other. System bus 2204 may be any of several types of bus structures including a memory bus or memory controller, a peripheral bus, and a local bus using any of a variety of bus architectures. A basic input/output (BIOS) stored in ROM 2208 or the like, may provide the basic routine that helps to transfer information between elements within information handling system 114, such as during start-up. Information handling system 114 further includes storage devices 2214 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 2214 may include software modules 2216, 2218, and 2220 for controlling processor 2202. Information handling system 114 may include other hardware or software modules. Storage device 2214 is connected to the system bus 2204 by a drive interface. The drives and the associated computer-readable storage devices provide nonvolatile storage of computer-readable instructions, data structures, program modules and other data for information handling system 114. In one aspect, a hardware module that performs a particular function includes the software component stored in a tangible computer-readable storage device in connection with the necessary hardware components, such as processor 2202, system bus 2204, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 114 is a small, handheld computing device, a desktop computer, or a computer server. When processor 2202 executes instructions to perform "operations", processor 2202 may perform the operations directly and/or facilitate, direct, or cooperate with another device or component to perform the operations.

As illustrated, information handling system 114 employs storage device 2214, which may be a hard disk or other types of computer-readable storage devices which may store data that are accessible by a computer, such as magnetic cassettes, flash memory cards, digital versatile disks (DVDs), cartridges, random access memories (RAMs) 2210, read only memory (ROM) 2208, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 114, an input device 2222 represents any number of input mechanisms, such as a microphone for speech, a touch-sensitive screen for gesture or graphical input, keyboard, mouse, motion input, speech and so forth. Additionally, input device 2222 may take in data from array laterolog tool 102 (e.g., referring to FIG. 1), discussed above. An output device 2224 may also be one or more of a number of output mechanisms known to those of skill in the art. In some instances, multimodal systems enable a user to provide multiple types of input to communicate with information handling system 114. Communications interface 2226 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 2202, that is purpose-built to operate as an equivalent to software executing on a general-purpose processor. For example, the functions of one or more processors presented in FIG. 22 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 308 for storing software performing the operations described below, and random-access memory (RAM) 310 for storing results. Very large-scale integration (VLSI) hardware embodiments, as well as custom VLSI circuitry in combination with a general-purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 114 may practice all or part of the recited methods, may be a part of the recited systems, and/or may operate according to instructions in the recited tangible computer-readable storage devices. Such logical operations may be implemented as modules configured to control processor 2202 to perform particular functions according to the programming of software modules 2216, 2218, and 2220.

In examples, one or more parts of the example information handling system 114, up to and including the entire information handling system 114, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization computer layer may operate on top of a physical computer layer. The virtualization computer layer may include one or more virtual machines, an overlay network, a hypervisor, virtual switching, and any other virtualization application.

Figure 23:
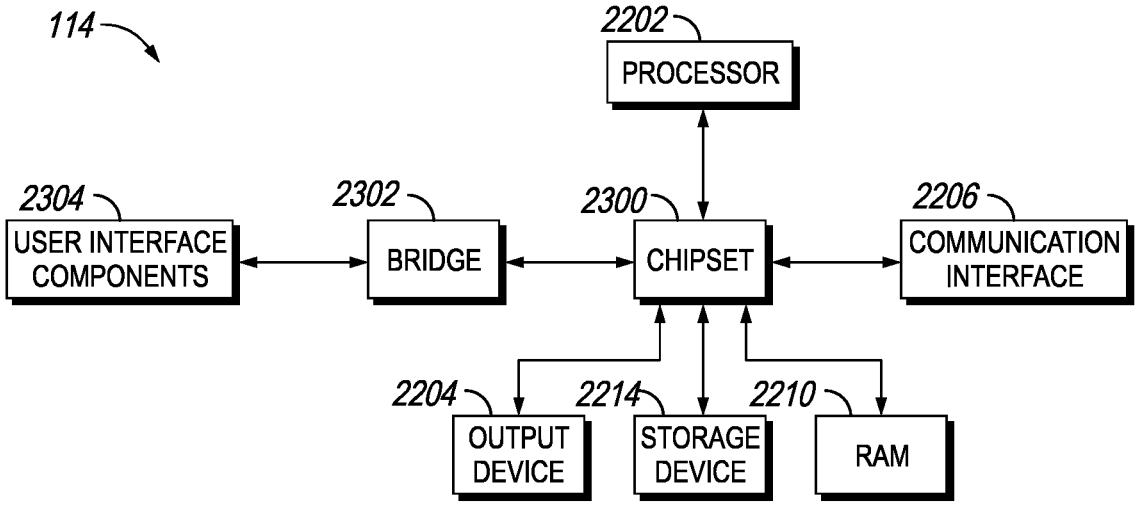
FIG. 23 illustrates an example information handling system.

FIG. 23 illustrates an example information handling system 114 having a chipset architecture that may be used in executing the described method and generating and displaying a graphical user interface (GUI). Information handling system 114 is an example of computer hardware, software, and firmware that may be used to implement the disclosed technology. Information handling system 114 may include a processor 2202, representative of any number of physically and/or logically distinct resources capable of executing software, firmware, and hardware configured to perform identified computations. Processor 2202 may communicate with a chipset 2300 that may control input to and output from processor 2202. In this example, chipset 2300 outputs information to output device 2224, such as a display, and may read and write information to storage device 2214, which may include, for example, magnetic media, and solid-state media. Chipset 2300 may also read data from and write data to RAM 2210. Bridge 2302 for interfacing with a variety of user interface components 2304 may be provided for interfacing with chipset 2300. User interface components 2304 may include a keyboard, a microphone, touch detection and processing circuitry, a pointing device, such as a mouse, and so on. In general, inputs to information handling system 114 may come from any of a variety of sources, machine generated and/or human generated.

Chipset 2300 may also interface with one or more communication interfaces 2226 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 2202 analyzing data stored in storage device 2214 or RAM 2210. Further, information handling system 114 receives inputs from a user via user interface components 2304 and executes appropriate functions, such as browsing functions by interpreting these inputs using processor 2202.

In examples, information handling system 114 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

In examples, information handling system 114 may also include tangible and/or non-transitory computer-readable storage devices for carrying or having computer-executable instructions or data structures stored thereon. The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof)

through a communications network. In a distributed computing environment, program modules may be located in both local and remote memory storage devices.

Figure 24:
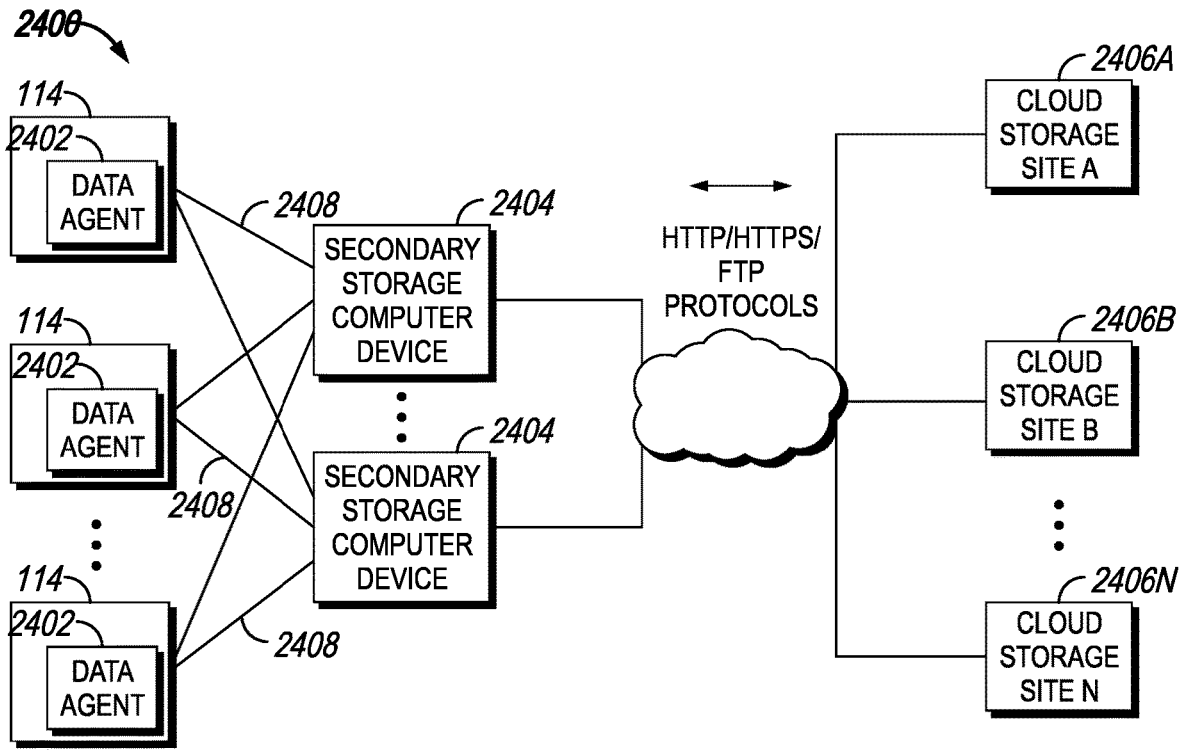
FIG. 24 illustrates an example of one arrangement of resources in a computing network.

FIG. 24 illustrates an example of one arrangement of resources in a computing network 2400 that may employ the processes and techniques described herein, although many others are of course possible. As noted above, an information handling system 114, as part of their function, may utilize data, which includes files, directories, metadata (e.g., access control list (ACLS) creation/edit dates associated with the data, etc.), and other data objects. The data on the information handling system 114 is typically a primary copy (e.g., a production copy). During a copy, backup, archive or other storage operation, information handling system 114 may send a copy of some data objects (or some components thereof) to a secondary storage computing device 2404 by utilizing one or more data agents 2402.

A data agent 2402 may be a desktop application, website application, or any software-based application that is run on information handling system 114. As illustrated, information handling system 114 may be disposed at any rig site (e.g., referring to FIG. 1) or repair and manufacturing center. Data agent 2402 may communicate with a secondary storage computing device 2404 using communication protocol 2408 in a wired or wireless system. Communication protocol 2408 may function and operate as an input to a website application. In the website application, field data related to pre- and post-operations, generated DTCs, notes, and the like may be uploaded. Additionally, information handling system 114 may utilize communication protocol 2408 to access processed measurements, operations with similar DTCs, troubleshooting findings, historical run data, and/or the like. This information is accessed from secondary storage computing device 2404 by data agent 2402, which is loaded on information handling system 114.

Secondary storage computing device 2404 may operate and function to create secondary copies of primary data objects (or some components thereof) in various cloud storage sites 2406A-N. Additionally, secondary storage computing device 2404 may run determinative algorithms on data uploaded from one or more information handling systems 138, discussed further below. Communications between the secondary storage computing devices 2404 and cloud storage sites 2406A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 2406A-N, the secondary storage computing device 2404 may also perform local content indexing and/or local object-level, sub-object-level or block-level deduplication when performing storage operations involving various cloud storage sites 2406A-N. Cloud storage sites 2406A-N may further record and maintain DTC code logs for each downhole operation or run, map DTC codes, store repair and maintenance data, store operational data, and/or provide outputs from determinative algorithms that are run at cloud storage sites 2406A-N. In examples, computing network 2400 may be communicatively coupled to array laterolog tool 102 (e.g., referring to FIG. 1). As previously described, information handling system 114 may be operable via telemetry techniques to receive downhole measurements at surface 108.

The methods and systems described above are an improvement over current technology in that does not require manual implement borehole corrective BC resistivities variation and borehole dependency. Instead, classifying the invasion and non-invasion formation consistently and accurately and providing an indicator for measuring the inversion quality to guide the user to fine tune the inversion constraint parameters.

The systems and methods for using an array laterolog tool in an environment which may include any of the various features of the systems and methods disclosed herein, including one or more of the following statements. Additionally, the systems and methods for an acoustic tool in a downhole environment may include any of the various features of the systems and methods disclosed herein, including one or more of the following statements.

Statement 1. A method comprising disposing a tool into a borehole, wherein the tool comprises: one or more guard electrodes configured to transmit a current into at least a formation surrounding the borehole; and one or more monitor electrodes configured to obtain one or more measurements from at least the formation surrounding the borehole; performing a first inversion on the one or more measurements to form a first inversion set; performing a second inversion on the one or more measurements to form a second inversion set; forming a misfit of the first inversion and a misfit of the second inversion based at least on the first inversion set and second inversion set; determining a weighting inversion coefficient based at least on the misfit of the first inversion and the misfit of the second inversion; and combining the first invasion set, the second invasion set, and/or weighting inversion coefficient to form one or more inversion products.

Statement 2. The method of statement 1, wherein one or more inversion products are diameter thickness $d_{bh}$ and invasion diameter thickness $d_{xo}$ comprising mud resistivity $R_m$, invasion resistivity $R_{xo}$, and/or formation resistivity $R_t$.

Statement 3. The method of statements 1 or 2, wherein the first inversion comprises a step model without invasion.

Statement 4. The method of statements 3 or 2, wherein the second inversion comprises a step radial formation model.

Statement 5. The method of statements 4 or 2, further comprising forming a misfit ratio as a ratio between the misfit of the first inversion and the misfit of the second inversion.

Statement 6. The method of statements 5 or 2, further comprising forming a first decision boundary and a second decision boundary.

Statement 7. The method of statements 6 or 2, wherein the first decision boundary is formed by an adjustable threshold based on the misfit ratio and the second decision boundary is greater than the first decision boundary.

Statement 8. The method of statements 7 or 2, wherein determining the weighting inversion coefficient by:

$$winv = \begin{cases} 0 & \text{if } \text{Ratio}_{misfit} < Thres1 \\ \dfrac{\text{Ratio}_{misfit} - Thres1}{Thres2 - Thres1} & \text{if } Thres1 \le \text{Ratio}_{misfit} \le Thres2 \\ 1 & \text{if } \text{Ratio}_{misfit} > Thres2 \end{cases}$$

wherein Thres1 is the first decision boundary, Thres2 is the second decision boundary, and $\text{Ratio}_{misfit}$ is the misfit ratio.

Statement 9. The method of statements 8 or 2, further comprising calculating a final inversion result for an invasion diameter by:

23 24

$$dxo_{final} = winv \times dxo_{inv}$$

wherein $dxo_{final}$ is the final inversion result for the invasion
diameter, winv is the weighting inversion coefficient, and
$dxo_{inv}$ is an invasion diameter of the first inversion.

Statement 10. The method of statements 8 or 2, further
comprising calculating a final inversion result for an inva-
sion diameter by:

$$dxo_{final} = winv \times dxo_{inv}$$

wherein $dxo_{final}$ is the final inversion result for the invasion
diameter, winv is the weighting inversion coefficient, and
$dxo_{inv}$ is an invasion diameter of the first inversion.

Statement 11. The method of statements 8 or 2, further
comprising calculating a final inversion result for the formation zone resistivity by:

$$Rt_{final} = winv \times Rt_{inv} + (1 - winv) \times Rt_{n-inv}$$
wherein $Rt_{final}$ is the final inversion result for the formation
resistivity, winv weighting inversion coefficient, and $Rt_{n-inv}$
is a formation resistivity of the second inversion.

Statement 12. The method of statements 1-11, further
comprising performing a statistical analysis on the one or
more inversion products, wherein a statistical analysis may
comprise a median, a mean filter or any other statistical data
operation to remove one or more spikes from the one or
more inversion products.

Statement 13. A non-transitory storage computer-readable
medium storing one or more instructions that, when
executed by a processor, cause the processor to: obtain one
or more measurements of current or voltage acquired by a
tool; perform a first inversion on the one or more measurements to form a first inversion set; perform a second
inversion on the one or more measurements to form a second
inversion set; form a misfit of the first inversion and a misfit
of the second inversion based at least on the first inversion
set and second inversion set; determine a weighting inversion coefficient based at least on the misfit of the first
inversion and the misfit of the second inversion; and com-
bine the first invasion set, the second invasion set, and/or
weighting inversion coefficient to form one or more inver-
sion products.

Statement 14. The non-transitory storage computer-read-
able medium of statement 13, wherein the first inversion
comprises a step model without invasion and the second
inversion comprises a step radial formation model.

Statement 15. The non-transitory storage computer-readable medium of statement 14, wherein the one or more
instructions, that when executed by the processor, further
cause the processor to form a misfit ratio as a ratio between
the misfit of the first inversion and the misfit of the second
inversion.

Statement 16. The non-transitory storage computer-read-
able medium of statement 15, wherein a first decision
boundary is formed by an adjustable threshold based on the
misfit ratio.

Statement 17. The non-transitory storage computer-readable medium of statement 16, wherein a second decision
boundary is greater than the first decision boundary.

Statement 18. The non-transitory storage computer-read-
able medium of statement 17, wherein the determining
weighting inversion coefficient is calculated by:

$$winv = \begin{cases} 0 & \text{if } Ratio_{misfit} < Thres1 \\ \dfrac{Ratio_{misfit} - Thres1}{Thres2 - Thres1} & \text{if } Thres1 \leq Ratio_{misfit} \leq Thres2 \\ 1 & \text{if } Ratio_{misfit} > Thres2 \end{cases}$$

wherein Thres1 is the first decision boundary, Thres2 is the
second decision boundary, and $Ratio_{misfit}$ is the misfit ratio.

Statement 19. The non-transitory storage computer-read-
able medium of statement 18, wherein the determining
weighting inversion coefficient is calculated by:

$$dxo_{final} = winv \times dxo_{inv}$$

wherein $dxo_{final}$ is the final inversion result for the invasion
diameter, winv is weighting inversion coefficient, and $dxo_{inv}$
is an invasion diameter of the first inversion.

Statement 20. The non-transitory storage computer-read-
able medium of statements 13-19, wherein the one or more
instructions, that when executed by the processor, further
cause the processor to perform a statistical analysis on the
one or more inversion products, wherein a statistical analy-
sis may comprise a median, a mean filter or any other
statistical data operation to remove one or more spikes from
the one or more inversion products.

The preceding description provides various examples of
the systems and methods of use disclosed herein which may
contain different method steps and alternative combinations
of components. It should be understood that, although
individual examples may be discussed herein, the present
disclosure covers all combinations of the disclosed
examples, including, without limitation, the different com-
ponent combinations, method step combinations, and prop-
erties of the system. It should be understood that the
compositions and methods are described in terms of "com-
prising," "containing," or "including" various components
or steps, the compositions and methods may also "consist
essentially of" or "consist of" the various components and
steps. Moreover, the indefinite articles "a" or "an," as used
in the claims, are defined herein to mean one or more than
one of the elements that it introduces.

For the sake of brevity, only certain ranges are explicitly
disclosed herein. However, ranges from any lower limit may
be combined with any upper limit to recite a range not
explicitly recited, as well as ranges from any lower limit
may be combined with any other lower limit to recite a range
not explicitly recited, in the same way, ranges from any
upper limit may be combined with any other upper limit to
recite a range not explicitly recited. Additionally, whenever
a numerical range with a lower limit and an upper limit is
disclosed, any number and any included range falling within
the range are specifically disclosed. In particular, every
range of values (of the form, "from about a to about b," or,
equivalently, "from approximately a to b," or, equivalently,
"from approximately a-b") disclosed herein is to be under-
stood to set forth every number and range encompassed
within the broader range of values even if not explicitly
recited. Thus, every point or individual value may serve as
its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

The invention claimed is:

1. A method comprising:
disposing a tool into a borehole, wherein the tool is communicatively coupled to an information handling system configured to control the tool and comprises:
a survey electrode and one or more guard electrodes configured to transmit a current into at least a formation surrounding the borehole; and
one or more monitor electrodes configured to obtain one or more measurements from at least the formation surrounding the borehole, wherein the survey electrode, the one or more guard electrodes, the one or more monitor electrodes, or any combination thereof enable identification of one or more invasion zones in the formation;
controlling, via the information handling system, the tool to identify an invasion zone in the formation by:
transmitting, via the survey electrode or the one or more guard electrodes, the current into the formation;
obtaining, via the one or more monitor electrodes, the one or more measurements;
evaluating, via the information handling system, the one or more measurements, wherein evaluating the one or more measurements comprises:
performing a first inversion on the one or more measurements to form a first inversion set;
performing a second inversion on the one or more measurements to form a second inversion set;
forming a misfit of the first inversion and a misfit of the second inversion based at least on the first inversion set and second inversion set;
determining a weighting inversion coefficient based at least on the misfit of the first inversion and the misfit of the second inversion; and
combining the first inversion set, the second inversion set, and weighting inversion coefficient to form one or more inversion products; and
determining, via the information handling system, invasion zone information associated with the formation based on the one or more inversion products.

2. The method of claim 1, wherein one or more inversion products are borehole diameter $d_{bh}$, mud resistivity $R_m$, invasion diameter $d_{xo}$, invasion resistivity $R_{xo}$, and/or formation resistivity $R_t$.

3. The method of claim 1, wherein the first inversion comprises a step radial model without invasion.

4. The method of claim 3, wherein the second inversion comprises a step radial formation model with invasion.

5. The method of claim 4, further comprising forming a misfit ratio as a ratio between the misfit of the first inversion and the misfit of the second inversion.

6. The method of claim 5, further comprising forming a first decision boundary and a second decision boundary.

7. The method of claim 6, wherein the first decision boundary is formed by an adjustable threshold based on the misfit ratio and the second decision boundary is greater than the first decision boundary.

8. The method of claim 7, wherein determining the weighting inversion coefficient is performed by:

$$winv = \begin{cases} 0 & \text{if } \text{Ratio}_{misfit} < Thres1 \\ \dfrac{\text{Ratio}_{misfit} - Thres1}{Thres2 - Thres1} & \text{if } Thres1 \le \text{Ratio}_{misfit} \le Thres2 \\ 1 & \text{if } \text{Ratio}_{misfit} > Thres2 \end{cases}$$

wherein Thres1 is the first decision boundary, Thres2 is the second decision boundary, and $\text{Ratio}_{misfit}$ is the misfit ratio.

9. The method of claim 8, further comprising calculating a final inversion result for an invasion diameter by:

$$dxo_{final} = winv \times dxo_{inv}$$

wherein $dxo_{final}$ is the final inversion result for the invasion diameter, winv is the weighting inversion coefficient, and $dxo_{inv}$ is an invasion diameter result of the second inversion.

10. The method of claim 8, further comprising calculating a final inversion result for an invasion zone resistivity by:

$$Rxo_{final} = winv \times Rxo_{inv} + (1 - winv) \times Rt_{n-inv}$$

wherein $Rxo_{final}$ is the final inversion result for the invasion zone resistivity, winv is the weighting inversion coefficient, $Rxo_{inv}$ is the invasion zone resistivity result of the second inversion, and $Rt_{n-inv}$ is a formation resistivity result of the first inversion.

11. The method of claim 8, further comprising calculating a final inversion result for the formation resistivity by:

$$Rt_{final} = winv \times Rt_{inv} + (1 - winv) \times Rt_{n-inv}$$

wherein $Rt_{final}$ is the final inversion result for the formation resistivity, winv is the weighting inversion coefficient, and $Rt_{inv}$ is a formation resistivity result of the second inversion.

12. The method of claim 1, further comprising performing a statistical analysis on the one or more inversion products, wherein a statistical analysis may comprise a median, a mean filter or any other statistical data operation to remove one or more spikes from the one or more inversion products.

13. A non-transitory storage computer-readable medium storing one or more instructions that, when executed by a processor, cause the processor to:

transmit, via a survey electrode or one or more guard electrodes, a current into a formation surrounding a borehole, wherein the survey electrode and one or more guard electrodes are disposed on a tool disposed in the borehole;

obtain, via one or more monitor electrodes disposed on the tool, one or more measurements of the formation, wherein the one or more monitor electrodes, the survey electrode, the one or more guard electrodes, or any combination thereof enable identification of one or more invasion zones in the formation;

control the tool to identify an invasion zone in the formation by, performing a first inversion on the one or more measurements to form a first inversion set;

performing a second inversion on the one or more measurements to form a second inversion set;

forming a misfit of the first inversion and a misfit of the second inversion based at least on the first inversion set and second inversion set;

determining a weighting inversion coefficient based at least on the misfit of the first inversion and the misfit of the second inversion; and combining the first inversion set, the second inversion set, and/or weighting inversion coefficient to form one or more inversion products; and determine invasion zone information associated with the formation based on the one or more inversion products.

14. The non-transitory storage computer-readable medium of claim 13, wherein the first inversion comprises a step model without invasion and the second inversion comprises a step radial formation model with invasion.

15. The non-transitory storage computer-readable medium of claim 14, wherein the one or more instructions, that when executed by the processor, further cause the processor to form a misfit ratio as a ratio between the misfit of the first inversion and the misfit of the second inversion.

16. The non-transitory storage computer-readable medium of claim 15, wherein a first decision boundary is formed by an adjustable threshold based on the misfit ratio.

17. The non-transitory storage computer-readable medium of claim 16, wherein a second decision boundary is greater than the first decision boundary.

18. The non-transitory storage computer-readable medium of claim 17, wherein the determining weighting inversion coefficient is calculated by:

$$winv = \begin{cases} 0 & \text{if } \text{Ratio}_{misfit} < Thres1 \\ \dfrac{\text{Ratio}_{misfit} - Thres1}{Thres2 - Thres1} & \text{if } Thres1 \leq \text{Ratio}_{misfit} \leq Thres2 \\ 1 & \text{if } \text{Ratio}_{misfit} > Thres2 \end{cases}$$

wherein Thres1 is the first decision boundary, Thres2 is the second decision boundary, and $\text{Ratio}_{misfit}$ is the misfit ratio.

19. The non-transitory storage computer-readable medium of claim 18, wherein the determining weighting inversion coefficient is calculated by:

$$dxo_{final} = winv \times dxo_{inv}$$

wherein $dxo_{final}$ is the final inversion result for the invasion diameter, winv is weighting inversion coefficient, and $dxo_{inv}$ is an invasion diameter of the second inversion.

20. The non-transitory storage computer-readable medium of claim 13, wherein the one or more instructions, that when executed by the processor, further cause the processor to perform a statistical analysis on the one or more inversion products, wherein a statistical analysis may comprise a median, a mean filter or any other statistical data operation to remove one or more spikes from the one or more inversion products.

\* \* \* \* \*